(12) United States Patent
Stahl et al.

(10) Patent No.: US 9,988,062 B2
(45) Date of Patent: Jun. 5, 2018

(54) CONNECTABLE DOLLY

(71) Applicant: ORBIS Corporation, Oconomowoc, WI (US)

(72) Inventors: Edward L. Stahl, Tyler, TX (US); Eric P. May, Canton, OH (US)

(73) Assignee: ORBIS Corporation, Oconomowoc, WI (US)

( * ) Notice: Subject to any disclaimer, the term of this patent is extended or adjusted under 35 U.S.C. 154(b) by 0 days. days.

(21) Appl. No.: 15/330,839

(22) Filed: Nov. 7, 2016

(65) Prior Publication Data

US 2017/0151974 A1  Jun. 1, 2017

Related U.S. Application Data

(60) Provisional application No. 62/252,256, filed on Nov. 6, 2015, provisional application No. 62/252,955, filed on Nov. 9, 2015, provisional application No. 62/275,102, filed on Jan. 5, 2016, provisional application No. 62/310,495, filed on Mar. 18, 2016, provisional application No. 62/367,283, filed on Jul.
(Continued)

(51) Int. Cl.
| | |
|---|---|
| *B62B 3/14* | (2006.01) |
| *B62B 3/00* | (2006.01) |
| *B62B 5/00* | (2006.01) |
| *B62B 3/16* | (2006.01) |

(52) U.S. Cl.
CPC ............ *B62B 3/1476* (2013.01); *B62B 3/008* (2013.01); *B62B 3/16* (2013.01); *B62B 5/0093* (2013.01); *B62B 2207/02* (2013.01)

(58) Field of Classification Search
CPC ......... B62B 3/1476; B62B 3/008; B62B 3/16; B62B 3/18; B62B 5/0093; B62B 2207/02
USPC ....................................................... 280/79.11
See application file for complete search history.

(56) References Cited

U.S. PATENT DOCUMENTS

| | | | |
|---|---|---|---|
| 3,073,274 A | | 1/1963 | Lamb |
| 3,208,768 A | * | 9/1965 | Hulbert .................... B60D 1/00 280/408 |

(Continued)

FOREIGN PATENT DOCUMENTS

| | | |
|---|---|---|
| CA | ID-99478 | 4/2003 |
| CA | 2757947 A1 | 5/2012 |

(Continued)

OTHER PUBLICATIONS

Russian Patent Office, International Search Report and Written Opinion of International Searching Authority for PCT/US2016/000098 dated Feb. 27, 2017 (7 pages).
(Continued)

*Primary Examiner* — John D Walters
(74) *Attorney, Agent, or Firm* — Joseph A. Fuchs; Greensfelder, Hemker & Gale, P.C.

(57) ABSTRACT

A connectable dolly having a platform with an upper surface, a peripheral edge and a bottom surface, a plurality of caster wheels extends from the bottom surface and are attached thereto, and a connector element is mounted to the platform proximal the peripheral edge and is moveable from a stored position to a deployed position, the connector element having a proximal end and a distal end, the distal end having an engaging member dimensioned for removably connecting the connectable dolly to a second dolly.

29 Claims, 33 Drawing Sheets

Related U.S. Application Data 27, 2016, provisional application No. 62/375,194, filed on Aug. 15, 2016.

(56) References Cited

U.S. PATENT DOCUMENTS

| | | | |
|---|---|---|---|
| 3,511,191 A | 5/1970 | Barry, Jr. et al. | |
| 3,581,681 A | 6/1971 | Newton | |
| 3,610,720 A | 10/1971 | Hosmer | |
| 3,661,099 A | 5/1972 | Shelor | |
| 3,685,461 A | 8/1972 | Belcher | |
| 3,707,929 A | 1/1973 | Lauffer | |
| 3,719,157 A | 3/1973 | Arcocha et al. | |
| 3,720,176 A | 3/1973 | Munroe | |
| 3,757,704 A | 9/1973 | Allgeyer et al. | |
| 3,814,778 A | 6/1974 | Hashimoto et al. | |
| 3,846,348 A | 11/1974 | Horst | |
| 4,159,681 A | 7/1979 | Vandament | |
| 4,230,049 A | 10/1980 | Horne | |
| 4,241,555 A | 12/1980 | Dickens et al. | |
| 4,329,231 A | 5/1982 | Hoffman et al. | |
| 4,440,708 A | 4/1984 | Haataja et al. | |
| 4,467,728 A | 8/1984 | Horne | |
| 4,742,781 A | 5/1988 | Shuert | |
| 4,822,066 A | 4/1989 | Rehrig | |
| 4,824,129 A | 4/1989 | Rehrig | |
| 4,972,611 A | 11/1990 | Swartz et al. | |
| 5,069,358 A | 12/1991 | Avery, Jr. | |
| 5,329,862 A | 7/1994 | Breezer et al. | |
| 5,349,749 A | 9/1994 | Fiedler | |
| 5,401,456 A | 3/1995 | Alesi, Jr. et al. | |
| 5,413,052 A | 5/1995 | Breezer et al. | |
| 5,528,994 A | 6/1996 | Iseli | |
| 5,590,606 A | 1/1997 | Crews et al. | |
| 5,592,885 A | 1/1997 | Young, Jr. et al. | |
| 5,636,577 A | 6/1997 | Gow | |
| 5,687,652 A | 11/1997 | Ruma | |
| 5,829,595 A | 11/1998 | Brown et al. | |
| 5,832,841 A | 11/1998 | Crews et al. | |
| 5,833,207 A | 11/1998 | Hagenhoff et al. | |
| 5,921,566 A | 7/1999 | Kern et al. | |
| 6,012,587 A | 1/2000 | McCullough | |
| 6,209,464 B1 | 4/2001 | Elder | |
| 6,305,301 B1 | 10/2001 | Piper, Jr. et al. | |
| 6,345,828 B1 | 2/2002 | Pool et al. | |
| 6,357,366 B1 | 3/2002 | Frankenberg | |
| D459,049 S | 6/2002 | Apps et al. | |
| 6,420,459 B1 | 7/2002 | Horold | |
| D472,028 S | 3/2003 | Stahl | |
| 6,659,020 B1 | 12/2003 | Ball | |
| 6,675,723 B2 | 1/2004 | Sukeva | |
| 6,718,888 B2 | 4/2004 | Muirhead | |
| 6,748,876 B2 | 6/2004 | Preisler et al. | |
| 6,758,148 B2 | 7/2004 | Torrey et al. | |
| 6,886,787 B2 | 5/2005 | Stahl | |
| 6,928,933 B2 | 8/2005 | Grau | |
| 6,971,518 B1 | 12/2005 | Lowry | |
| 6,974,140 B2 | 12/2005 | Neuman | |
| 6,998,433 B2 | 2/2006 | Overholt et al. | |
| 7,036,833 B1 | 5/2006 | Berna et al. | |
| 7,044,065 B2 | 5/2006 | Arai et al. | |
| 7,059,617 B1 | 6/2006 | Verna | |
| 7,066,477 B2 | 6/2006 | Dubois et al. | |
| 7,413,698 B2 | 8/2008 | Bearse et al. | |
| 7,419,457 B1 | 9/2008 | Sudeith et al. | |
| 7,874,256 B2 | 1/2011 | Muirhead | |
| 8,141,500 B2 | 3/2012 | Naidu et al. | |
| 8,181,580 B2 | 5/2012 | Roth et al. | |
| 8,215,244 B2 | 7/2012 | Apps | |
| 8,261,673 B2 | 9/2012 | Ingham | |
| 8,317,204 B2 * | 11/2012 | Meers | B62B 3/02 280/33.992 |
| 8,418,632 B2 | 4/2013 | Linares | |
| 8,544,648 B2 | 10/2013 | Cleveland et al. | |
| 8,567,324 B1 | 10/2013 | Paradis et al. | |
| 9,102,437 B2 | 8/2015 | Frankenberg | |
| 9,327,873 B2 | 5/2016 | Frankenberg | |
| 9,522,760 B2 | 12/2016 | Frankenberg | |
| 2004/0168618 A1 | 9/2004 | Muirhead | |
| 2005/0103237 A1 | 5/2005 | Moore et al. | |
| 2006/0011108 A1 | 1/2006 | Abu-Isa et al. | |
| 2008/0149111 A1 | 6/2008 | Harrison et al. | |
| 2009/0085315 A1 | 4/2009 | Meers et al. | |
| 2009/0116925 A1 | 5/2009 | Juchniewicz et al. | |
| 2012/0111238 A1 | 5/2012 | Frankenberg | |
| 2012/0267869 A1 * | 10/2012 | Hassell | B62B 5/0093 280/79.11 |
| 2013/0248674 A1 | 9/2013 | Johnson et al. | |
| 2016/0207550 A1 | 7/2016 | Frankenberg | |

FOREIGN PATENT DOCUMENTS

| | | |
|---|---|---|
| DE | 3825219 | 2/1990 |
| EP | 0807563 A2 | 11/1997 |
| EP | 1306312 A1 | 5/2003 |
| EP | 2465784 | 6/2012 |
| FR | 1596011 | 7/1970 |
| GB | 2280166 A | 1/1995 |
| GB | 2359061 A | 8/2001 |
| GB | 2377689 A | 1/2003 |
| WO | 9316927 A1 | 9/1993 |
| WO | 03035495 A1 | 5/2003 |
| WO | 2006071920 A2 | 7/2006 |

OTHER PUBLICATIONS

DS Smith Companies; "Dura-Ply Pallets" circular; date unknown (1 page).

European Patent Office, Partial European Search Report for EP 2465784 dated May 25, 2012 (9 pages).

European Patent Office, Extended European Search Report for EP 11188320.3 dated Oct. 17, 2012 (15 pages).

International Search Report and Written Opinion of International Searching Authority for PCT/CA2011/001230 dated Feb. 13, 2012 (5 pages).

International Preliminary Report on Patentability for PCT/CA2011/001230 dated May 7, 2013 (1 page).

European Search Report for EP 02019552 dated Jan. 28, 2003 (4 pages).

Wiggins Plastics, Inc.; "Thermosets: Engineering Plastics for Demanding Applications"; retrieved from <http://www.jobshop.com/techinfo/papers/plasticstermpoly.shtml> on Oct. 31, 2014 (3 pages).

Mexican Patent Office, First Office Action in MX/a/2011/011870 dated Mar. 2, 2015 (2 pages).

Holden Plastics Corporation; "Thermosets: Engineering Plastics for Demanding Applications"; retrieved from <http://web.archive.org/web/20060315191104/http://ww.jobshop.com/techinfo/papers/plasticstermpoly.shtml> on Oct. 22, 2014 (3 pages).

* cited by examiner

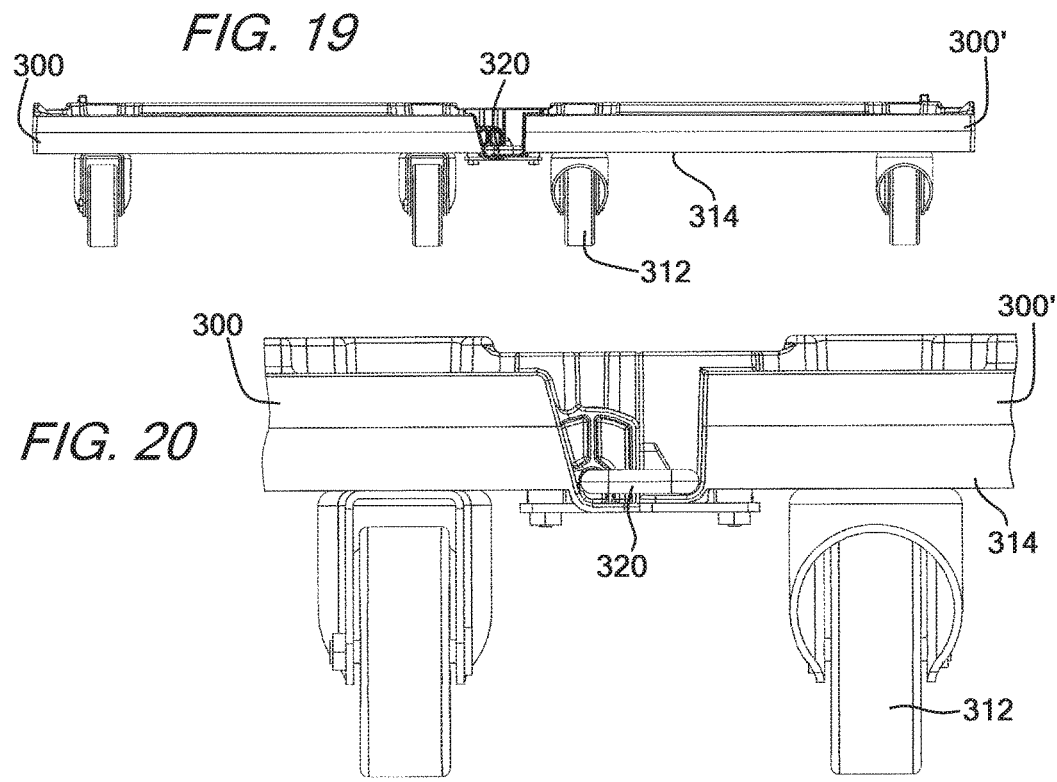
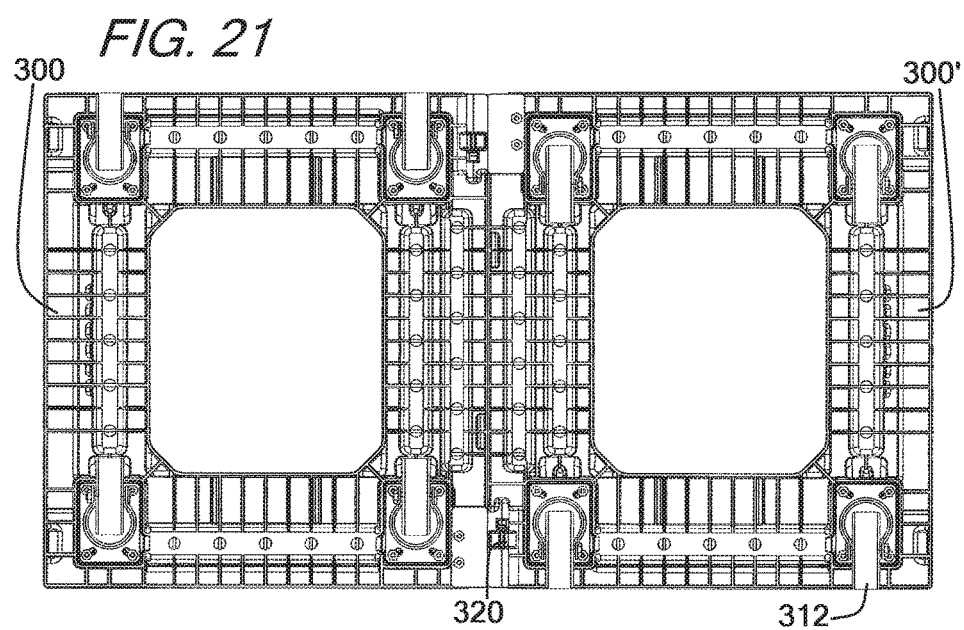

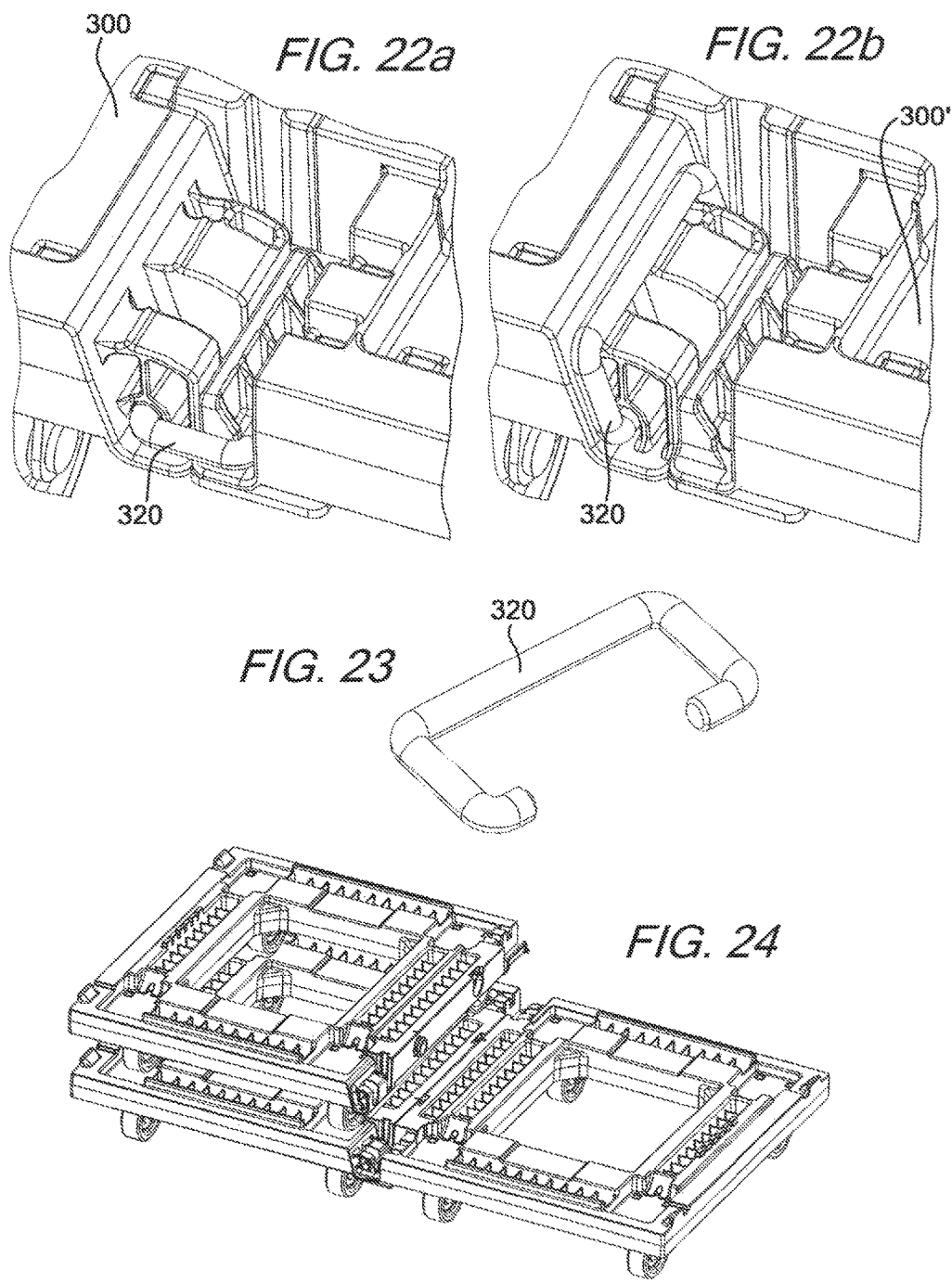

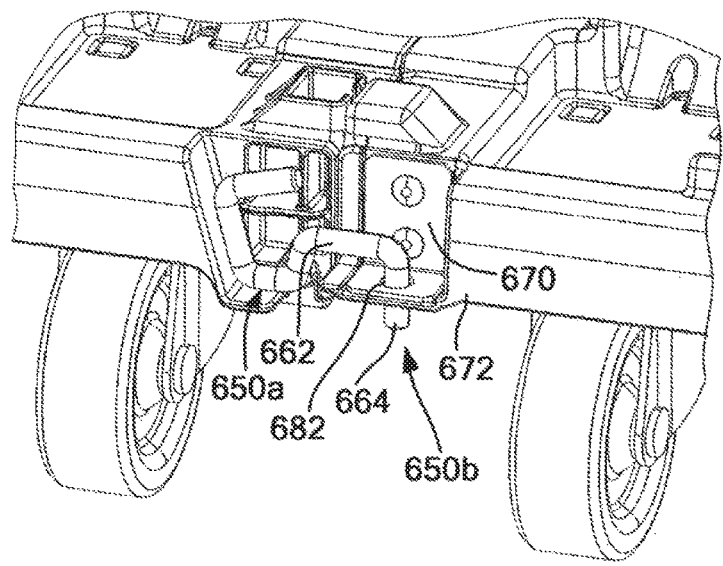
FIG. 42
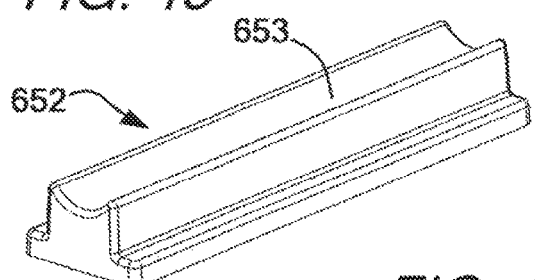
FIG. 43
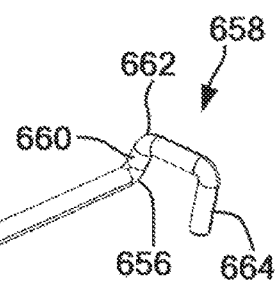
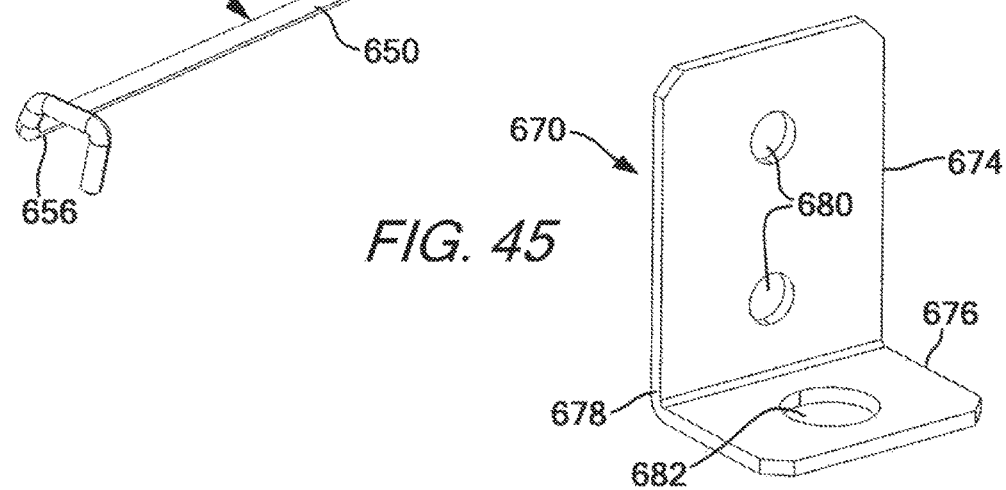
FIG. 44
FIG. 45

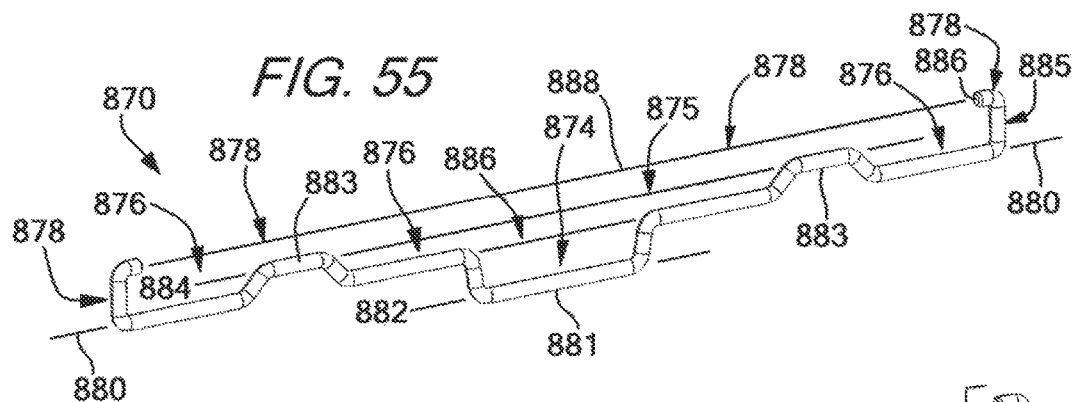
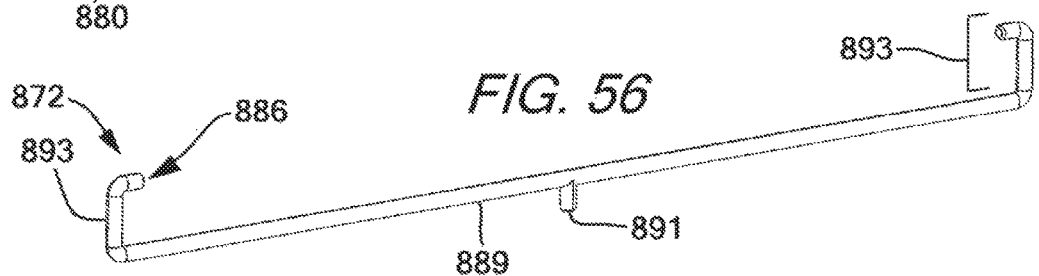
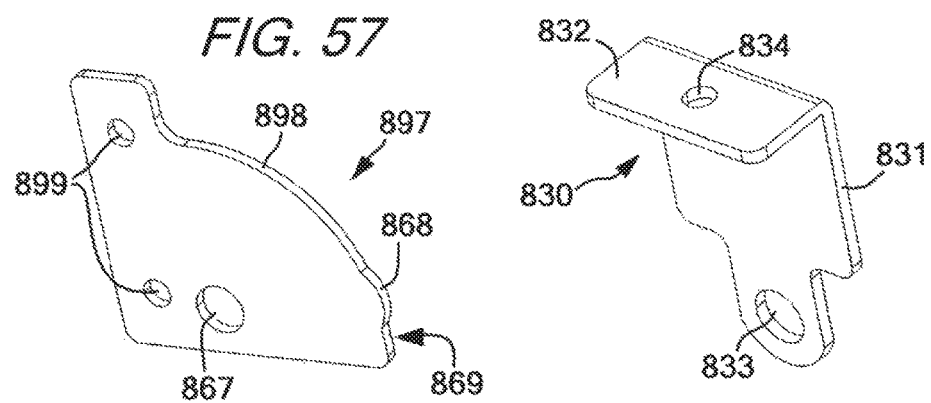
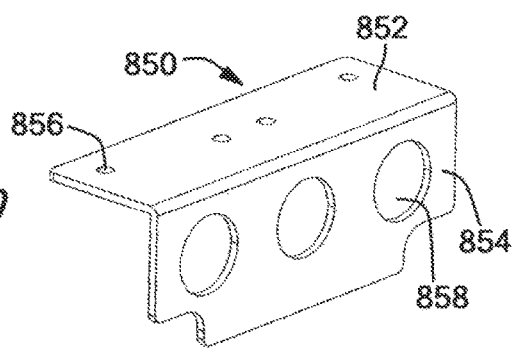

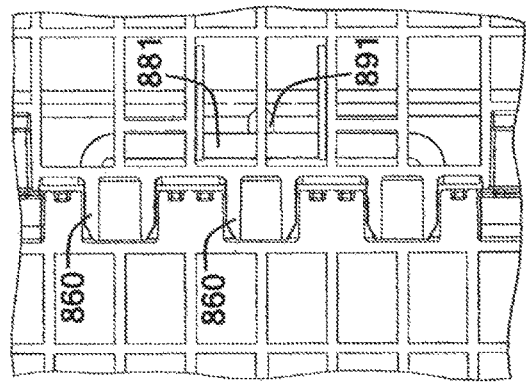
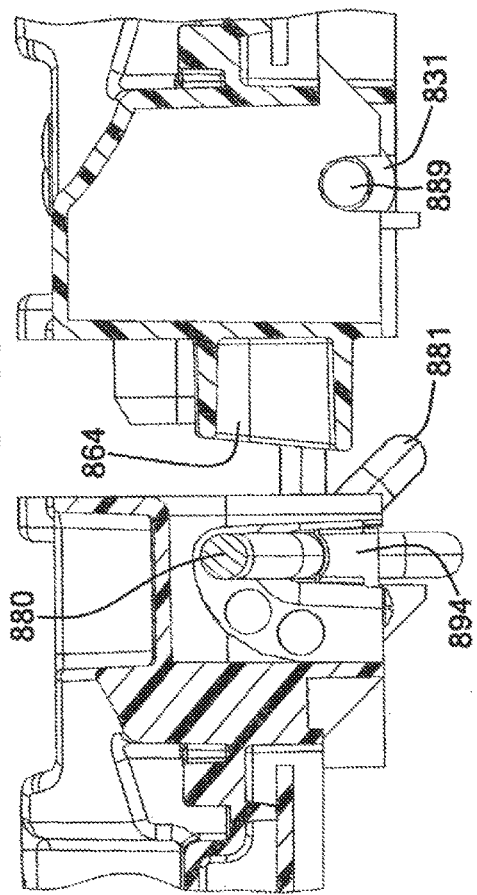
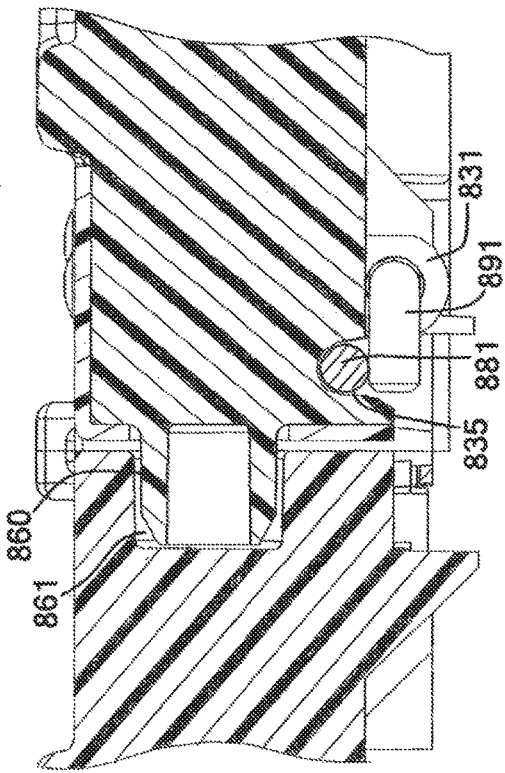

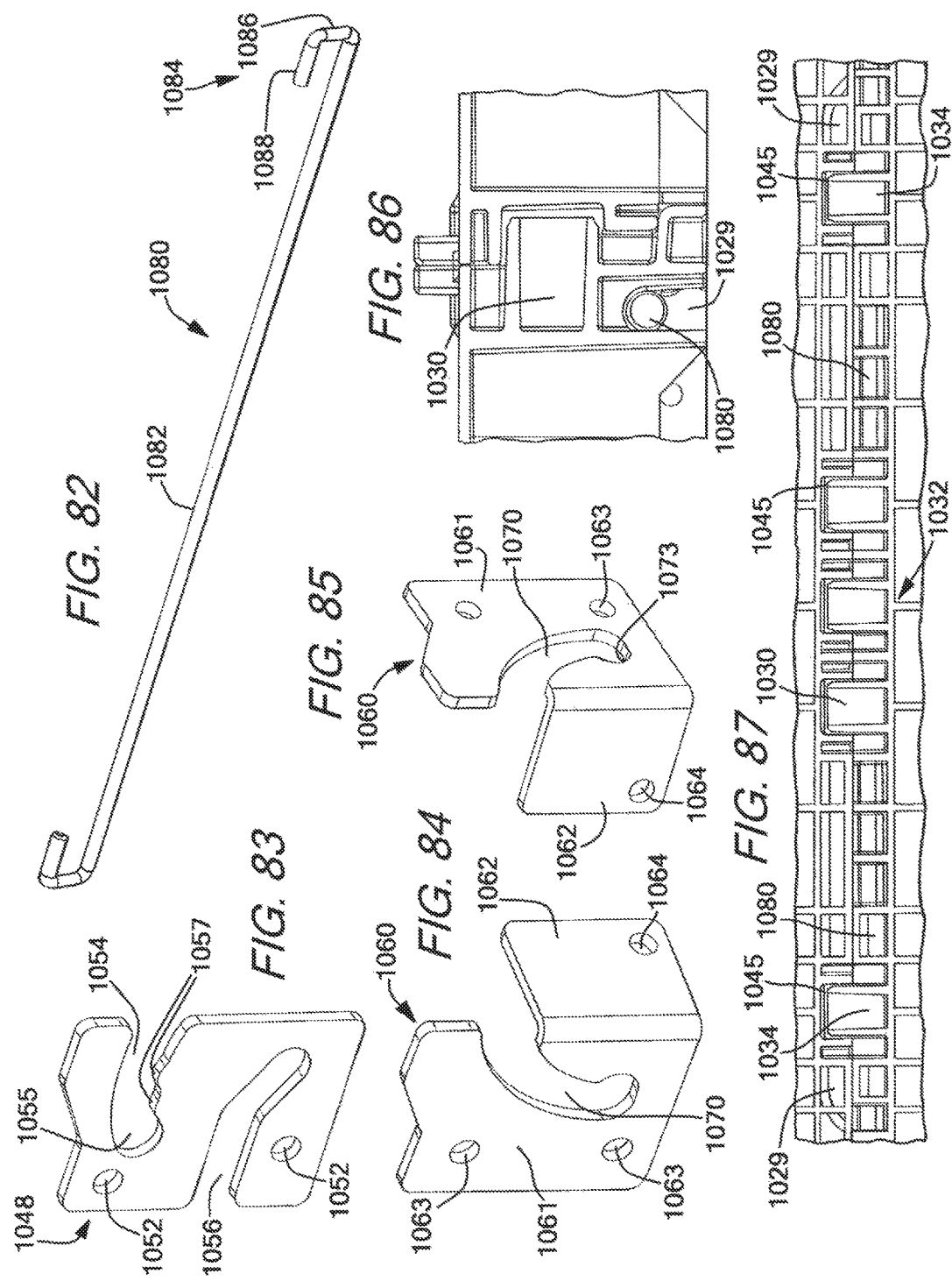

CONNECTABLE DOLLY

RELATED U.S. APPLICATION DATA

The present invention claims the benefit of U.S. Provisional Patent Application No. 62/252,256 filed Nov. 6, 2015, U.S. Provisional Patent Application No. 62/252,955 filed Nov. 9, 2015, U.S. Provisional Patent Application No. 62/275,102 filed Jan. 5, 2016, U.S. Provisional Patent Application No. 62/310,495 filed Mar. 18, 2016, U.S. Provisional Patent Application No. 62/367,283 filed Jul. 27, 2016, and U.S. Provisional Patent Application No. 62/375,194 filed Aug. 15, 2016, the contents of which are incorporated herein by reference.

FIELD OF THE INVENTION

A dolly or other similar structure, with a deployable connector for removably connecting two dollies in lateral juxtaposition.

BACKGROUND OF THE INVENTION

Pallets and dollies are in extensive use worldwide to facilitate the movement of goods. Both pallets and dollies may be described as low to the ground, portable platforms on which goods may be stacked for storage or moving. The two devices are distinguished primarily by their type of undersurface or ground contact. Pallets have a fixed, non-rolling bottom surface, whereas dollies have wheels, with or without brakes.

A common type of pallet bottom surface is a skid, which is a continuous plank that provides support along its whole length. Pallets generally also include open ends configured to receive the forks of a manual pallet jack, motorized forklift truck, or other lifting device, so that the palletized load can be raised and moved about easily.

Pallets are particularly suitable for storing goods, such as in a racking arrangement, at a warehouse, moving goods on conveyor belts and roll conveyors, and for transporting goods between distant locations, where the pallets are loaded onto shipping containers, trucks, railway cars, and other vehicles. Dollies are better suited for the internal movement of goods within a given location where pallet moving equipment such as manual pallet jacks or forklift trucks would be unwieldy or costly. For example, unloading a shipment of goods at a supermarket is often more efficiently accomplished by having the stocking clerk wheel a dolly holding the goods to the appropriate display section of the store, rather than through use of a forklift.

One drawback to existing dollies is that they have a fixed planar surface area, or footprint, to accommodate loads of varying sizes. In some instances, the load area exceeds the footprint of the dolly and the load is subject to sliding or falling from the dolly. The present invention provides a mechanism for joining two dollies together in lateral juxtaposition for movement as a single dolly of increased surface area.

Other features and advantages of the invention will be apparent from the following specification taken in conjunction with the following Figures.

SUMMARY OF THE INVENTION

The present invention provides a connectable dolly having a platform with an upper surface, a peripheral edge and a bottom surface. A plurality of caster wheels extend from the bottom surface and are attached thereto. A connector element is mounted to the platform proximal the peripheral edge and is moveable from a stored position to a deployed position, the connector element having a proximal end and a distal end, the distal end having an engaging member dimensioned for removably connecting the connectable dolly to a second dolly.

In one form of the connectable dolly, the connector element is disposed in a pocket in the peripheral edge. In another aspect of the invention, the connector element is spring loaded. In yet another aspect, the connector element is a bail arm mounted along a portion of the peripheral edge for rotational motion about an axis between the stored position and the deployed position. In one form, the bail arm is elongate and has a first end and a second end opposed to the first end, the axis extends in a direction either parallel to the vertical surface or generally transverse to the vertical surface. In another aspect of the invention, a receiving member is on the second dolly for engaging the first end of the bail arm and can include a slot, or an arcuate slot, or an arcuate slot having a protuberance extending into the slot to form a pocket for retaining the first end from inadvertent disengagement. In another form, the receiving member is a through hole or a channel, upwardly facing or downwardly facing.

In one aspect of the invention, the axis is generally perpendicular to the vertical surface and extends through an intermediate portion of the bail arm between the first end and the second end. The axis is centrally disposed between the first end and the second end and the first end of the bail arm is mounted for movement between two vertically spaced positions, one of each corresponding to the stored position and the deployed position.

The present invention also provides a connectable dolly having a platform with an upper surface and a peripheral edge. A connector element is mounted to the platform proximal the peripheral edge and is moveable from a stored position to a deployed position. The connector element having a proximal end and a distal end. The distal end has an engaging member dimensioned for removably connecting the connectable dolly to a receiving member on a second dolly. The dolly also has an interlock feature on the peripheral edge. In one aspect, the interlock feature includes a protuberance extending from the peripheral edge for engaging a complementary-shaped member on the second dolly. The peripheral edge has a vertically extending surface and the protuberance extends from the vertically extending surface.

The peripheral edge includes a first lateral edge, a second lateral edge opposed to the first lateral edge, and a first end edge and a second end edge opposed to the first end edge, and the connector element being disposed on the first lateral edge. The interlock feature is on the first lateral edge or the second lateral edge and includes at least one wall extending away from a vertical surface of the peripheral edge. In one form, the wall is generally cylindrical. In another form, the interlock feature includes a plurality of cylindrical walls extending away from the vertical surface of the peripheral edge, and are horizontally spaced from one another. In another form, the interlock feature includes a plurality of horizontally spaced cylindrical walls centrally disposed on a portion of the peripheral edge and two flanking cylindrical walls, one of each of the two flanking walls disposed on opposite sides of the centrally disposed cylindrical walls and horizontally spaced therefrom.

The present invention also provides a connectable dolly having a platform with an upper surface, a peripheral edge and a bottom surface. The peripheral edge has a vertically extending surface. A ground engaging structure extends from the dolly, and a connector element is mounted to the dolly for reciprocal translational movement along an axis extending generally perpendicular to the vertical surface, and for rotation about the axis from a stored position to a deployed position. When in the deployed position a portion of the connector element releasably engages a receiving member on a second dolly. In one aspect, the connector has a first leg extending along the axis and a second leg for engaging the receiving member. A first portion of the first leg extends through a first through hole in the vertical surface and a second portion of the first leg extends beyond the vertical surface. The second leg extends transversely from the second portion and when in the deployed position a portion of the second leg is positioned in a second through hole on the vertical wall, and when in a deployed position is stowed in a third through hole of the second dolly. In one aspect, the first leg has a spring for applying a force along the axis of the first leg to retain the second leg in the stored position or the deployed position. The second leg serves as a handle for a user to pull the first leg away from the dolly against the spring force.

The present invention provides a connectable dolly having a platform with an upper surface, a peripheral edge and a bottom surface. The peripheral edge has a vertically extending surface. A ground engaging structure extends from the dolly. A first bail arm is mounted to a portion of the peripheral edge for rotation about an axis from a stored position to a deployed position, the first bail arm has a generally elongate central portion and connecting members at opposed ends of the central portion. When in the deployed position, a portion of the connecting members engage a corresponding receiving member on a second dolly. The axis extends generally parallel to a portion of the peripheral edge. A portion of the generally elongate central portion engages a corresponding structure on the second dolly when the first bail arm is in the deployed position. A portion of the generally elongate central portion has an engaging portion to cause the first bail arm to rotate when contacted by a member extending from a second dolly. In another aspect, a second bail arm is provided on the second dolly for engaging the first bail arm when the first bail arm is in the deployed position. In another form, the dolly has an interlock feature on the peripheral edge of the dolly.

BRIEF DESCRIPTION OF THE DRAWINGS

To understand the present invention, it will now be described by way of example, with reference to the accompanying Figures in which:

FIG. 19 is a side elevation view of the double dolly of FIG. 17.

FIG. 20 is an exploded view of the latch-type connector in a deployed position.

FIG. 21 is a bottom plan view of the double dolly of FIG. 17.

FIGS. 22a,b is an exploded perspective view of the latch-type connector in a deployed position and a stored position respectively.

FIG. 23 is a perspective view of a latch-type connector.

FIG. 24 is a perspective view of a double dolly with a single dolly stacked on top.

FIG. 42 is a perspective view of a portion of a first lateral edge of the dollies of FIG. 38 with a connector element in both a deployed and a stored position.

FIG. 43 is a perspective view of a bail arm retainer.

FIG. 44 is an enlarged view of a bail arm.

FIG. 45 is a perspective view of a bail arm latch.

FIG. 55 is a perspective view of a first bail arm.

FIG. 56 is a perspective view of a second bail arm.

FIG. 57 is a perspective view of a second bail arm end plate.

FIG. 58 is a perspective view of a second bail arm retainer plate.

FIG. 59 is a perspective view of an interlock reinforcement plate.

FIG. 60 is a side elevation view in partial cross-section of the dollies separated from one another and the first bail arm shown in numerous positions from an engaged position to a disengaged position.

FIG. 61 is a side elevation view in partial cross-section of two dollies engaged.

FIG. 62 is a bottom view of a portion of the dollies in an engaged position.

FIG. 82 is a perspective view of a bail arm.

FIG. 83 is a perspective view of a bail arm end plate.

FIGS. 84 and 85 are perspective views of a bail arm corner lock plate.

FIG. 86 is a cutaway view of an interlocking feature of two interlocked dollies.

FIG. 87 is a bottom view of the dollies showing guide posts.

DETAILED DESCRIPTION

Figure 1:
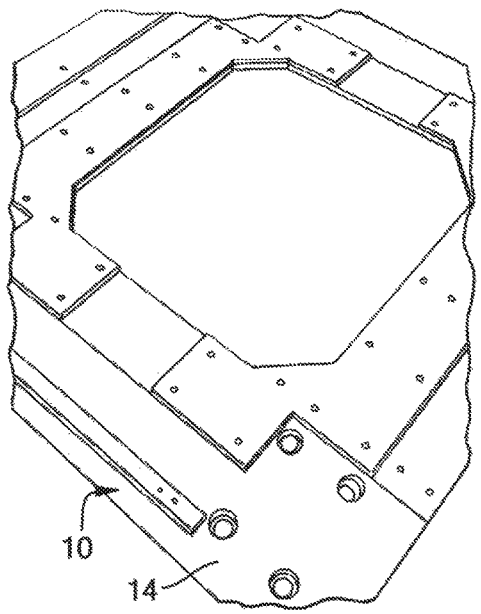
FIG. 1 is a bottom view of a single dolly.
Figure 2:
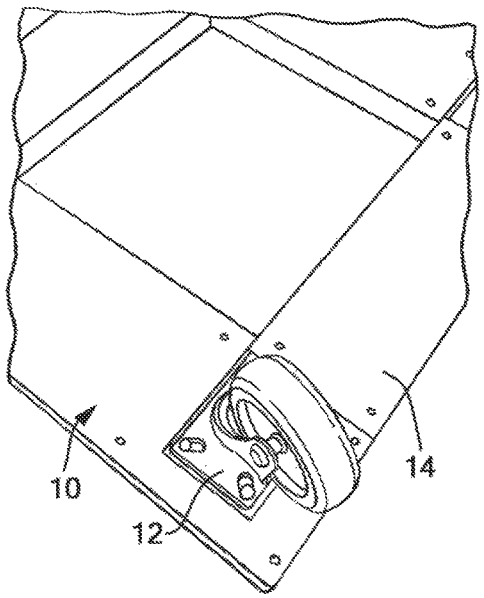
FIG. 2 is a bottom view of a single dolly showing a caster wheel.
Figure 3:
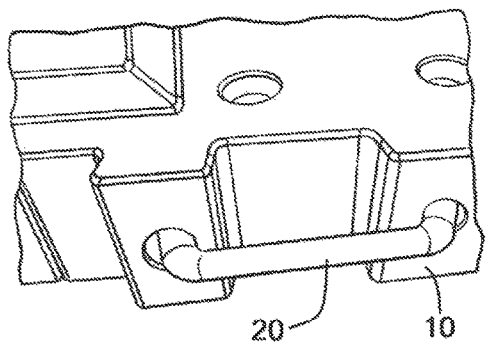
FIG. 3 is a perspective view of a single dolly with a connector element in a stowed position.
Figure 4:
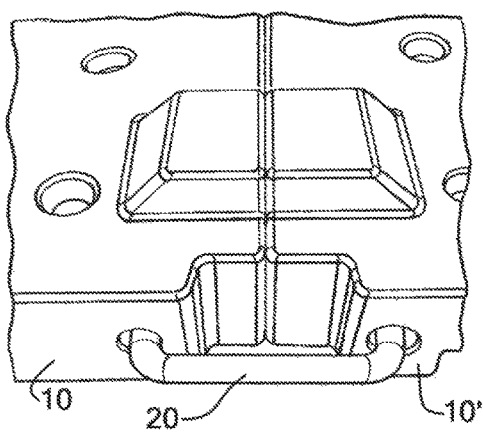
FIG. 4 is a perspective view of two dollies in lateral juxtaposition joined by a connector element in a deployed position to form a double dolly.
Figure 5:
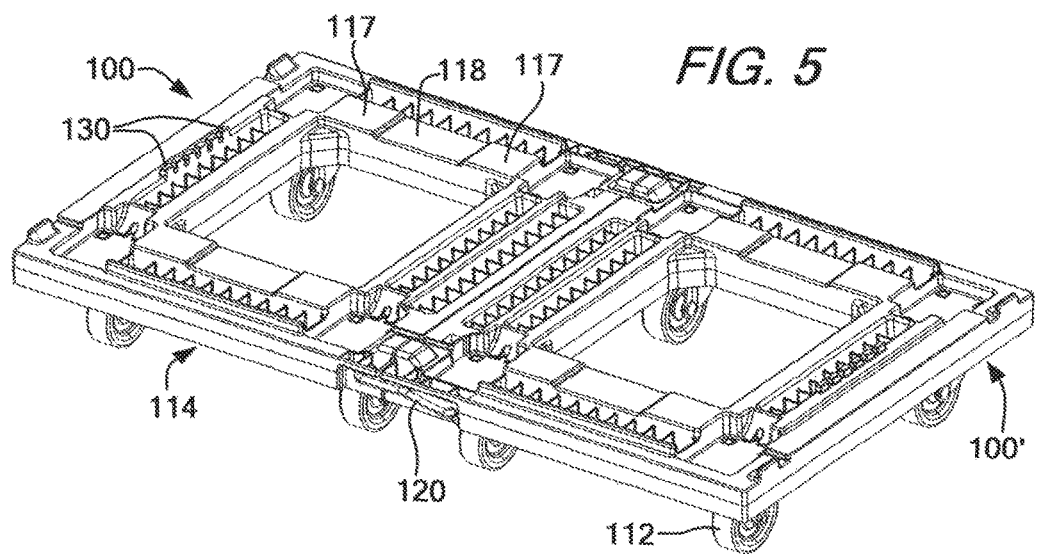
FIG. 5 is a perspective view of two dollies in lateral juxtaposition joined by a connector element to form a double dolly.
Figure 6:
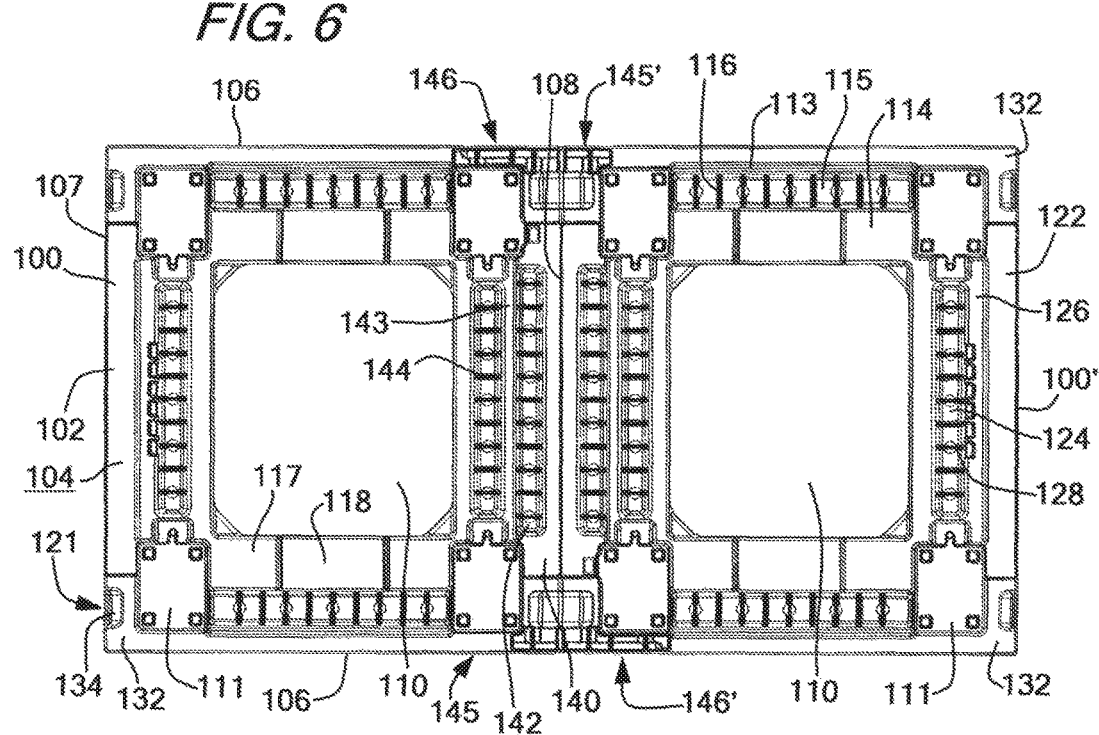
FIG. 6 is a top plan view of the double dolly of FIG. 5.
Figure 7:
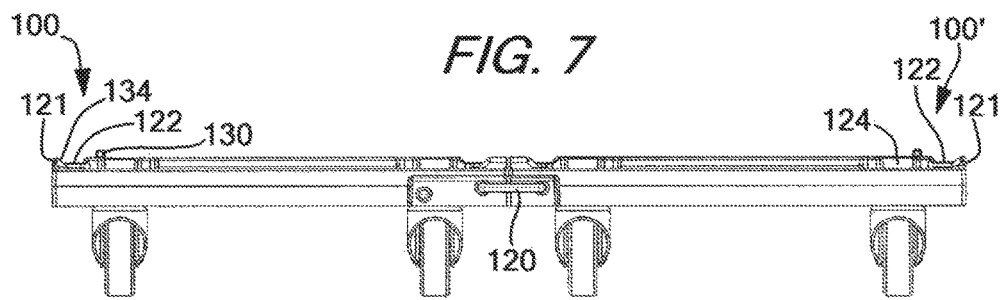
FIG. 7 is a side elevation view of the double dolly of FIG. 5.
Figure 8:
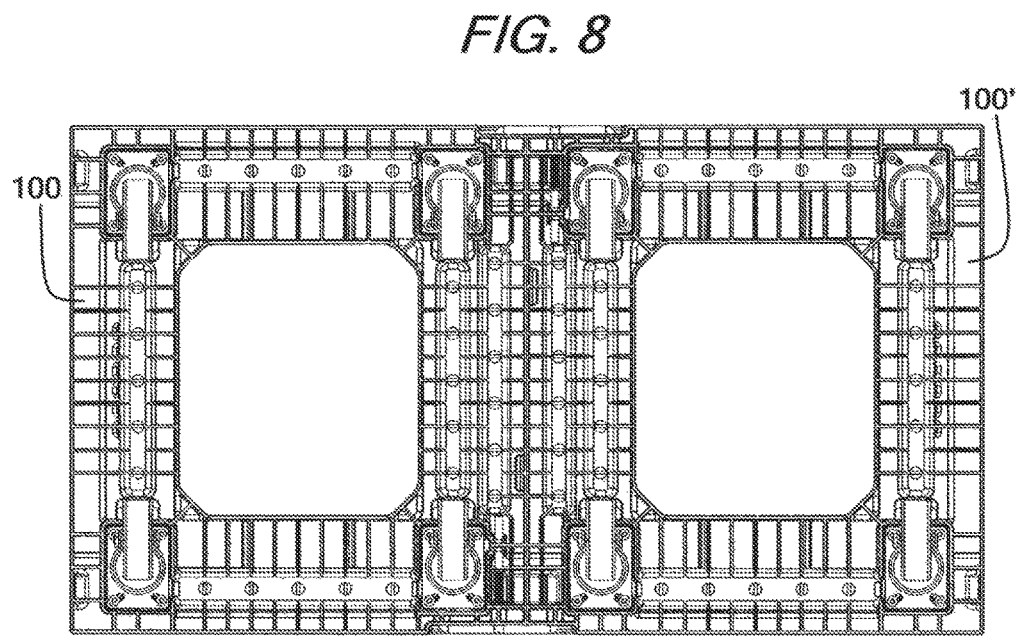
FIG. 8 is a bottom plan view of the double dolly of FIG. 5.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1-4 show a first embodiment of the present invention of a connectable dolly 10 having a plurality of caster wheels 12 extending from a bottom surface 14 and a connector element 20 moveable between a stored position (FIG. 3) to a deployed position (FIG. 4) where dolly 10 and 10' are joined together in lateral juxtaposition to form a double dolly. The connector element 20 is a generally U-shaped member. A connectable dolly allows a dolly to be connected to other similarly configured dollies along lateral edges to form a string of two or more connected dollies. A connectable dolly can also be configured to connect to other similarly configured dollies along two transversely extending edges to form an array of dollies, having columns and rows, that can expand in the two directions transverse to one another. The invention will be described in terms of a double dolly with the understanding that a greater number of dollies can be connected together linearly or along two axes without departing from the present invention. One principal advantage of the connectable dolly is that two dollies can be connected together without removing loads from the dollies.

FIGS. 5-13 show another embodiment of the present invention of a connectable dolly 100 and a double dolly having a platform 102 having an upper surface 104, two opposed end edges 106, a first lateral edge 107, a second lateral edge 108 and a centrally disposed aperture 110. Four wells 111 are positioned at corners of the platform 102 and a plurality of caster wheels 112 extend from a bottom surface 114 of the platform 102. The wells 111 are dimensioned to receive the caster wheels 112 of a similarly configured dolly when in a stacked configuration shown in FIG. 24. An inner and outer retaining wall 113,114 extend along each of the opposed end edges 106 between a pair of adjacent wells 111 and on opposed edges of a channel 115. A plurality of horizontally spaced ribs 116 extend across the channel in a direction generally perpendicular to the end edge 106. The inner retaining wall 114 is castellated having two flanking segments 117 of the same height and a central segment 118 of a lower height. At a corner of each of the end edges and the second lateral edges 108 is a connector element 120 that is moveable between a stored position (FIG. 13) to a deployed position (FIGS. 5-9). The connector element 120 allows the dolly to be releasably connected to other similarly situated dollies as will be described in greater detail below.

The first lateral edge 107 has a centrally disposed, generally rectangular strip 122, and a retaining wall 126 extending to a height above the strip 122 and is divided into two segments by a channel 124 having a plurality of horizontally spaced ribs 128 spanning the channel. A plurality of horizontally spaced tabs 130 extend above the retaining wall 126 and are generally rectangular in shape. At the corners 132 of the first lateral edge 107 and each end edge 106 is a surface below that of the rectangular strip 122 and has a segmented protuberance 121 having a radially inwardly and downwardly sloping face 134. A top surface of the protuberance 121 extends above the level of the strip 122.

Figure 11:
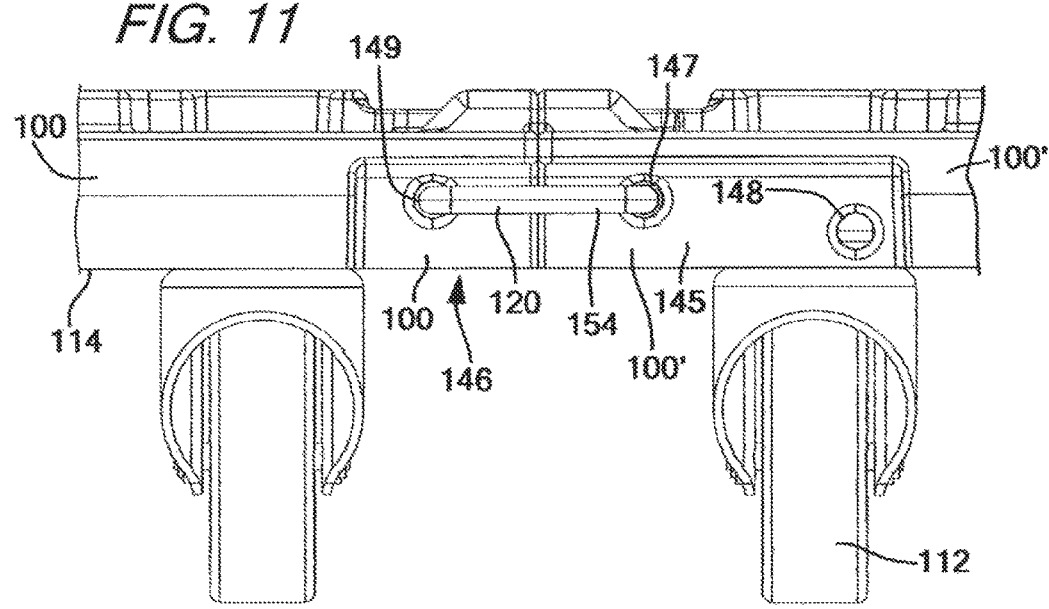
FIG. 11 is a side elevation view of two dollies in lateral juxtaposition with a J-bar latching mechanism in a deployed position connecting the two dollies.
Figure 12:
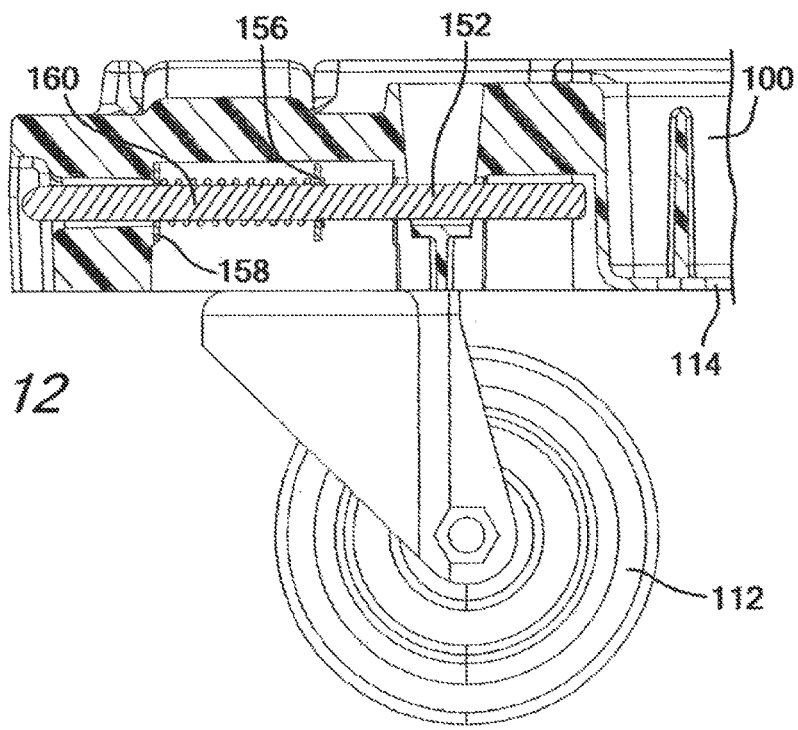
FIG. 12 is a side elevation view in partial cross-section of a leg of a J-bar latching mechanism in a deployed position.
Figure 13:
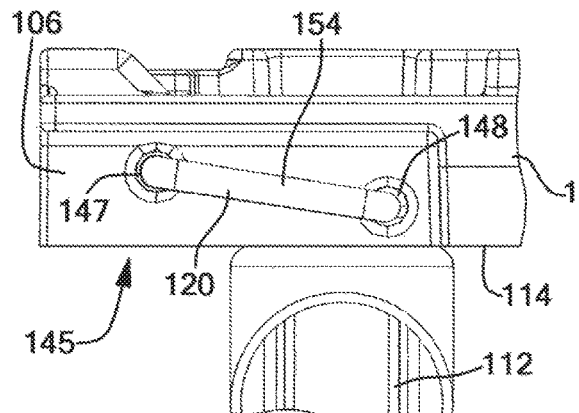
FIG. 13 is a side elevation view of a J-bar latching mechanism in a stored position.

The second lateral edge 108 has a retaining wall 140 divided into segments by two channels 142 separated by a dividing wall 143 and each channel contains a plurality of horizontally spaced ribs 144 spanning the channel. A first corner 145 of the second lateral edge 108 and an end edge 106 has two through holes 147 and 148 spaced from one another and vertically offset (FIG. 13) for retaining opposed ends of the connector element 120. FIG. 11 shows a second corner 146 having a third through hole 149. A description of the function of these holes and the connector element 120 is set forth below.

Another suitable dolly is disclosed in commonly assigned U.S. Pat. No. 6,886,787 which is incorporated herein in its entirely by reference and made a part hereof.

In one preferred form of the invention, the connector element 120 is generally J-shaped (FIG. 10) having a first leg 152 and a second leg 154 generally perpendicular to the first leg. The second leg serves as a handle for a user to grasp and move the connector element away from the dolly, against the spring force, from a stored position to an engaged position. In this example, the first leg 152 is longer than the second leg 154. A pair of spaced flanges 156,158 are connected by a spring 160 and are mounted to the first leg. The first flange 156 is generally disk shaped with a central hole that engages an outer surface of the first leg and is fixedly connected to the first leg by sealing ring 157. The second flange 158 is also disk shaped having a central hole dimensioned to slidingly engage an outer surface of the first leg. A return leg 162 extends from an end of the short leg 154 in a direction parallel to the long leg 152 and terminates in a blunt distal end 164. When the J-shaped connector 120 is in the stored position (FIG. 13), the short leg 154 extends between the first and second through holes 147,148 and the return leg 162 extends into the second through hole 148. When in the deployed position as best seen in FIG. 11, the short leg 154 spans the first through hole 147 in the second dolly 100' to the third through hole 149 in the first dolly 100 and the return leg 162 is received in the third through hole 149. On the opposite end of the second lateral edge 108, the short leg 154 spans the second through hole 147 of the first dolly 100 to the third through hole 149 of the second dolly 100' and the return leg 162 is received in the third through hole 149 of the second dolly 100'.

Figure 9:
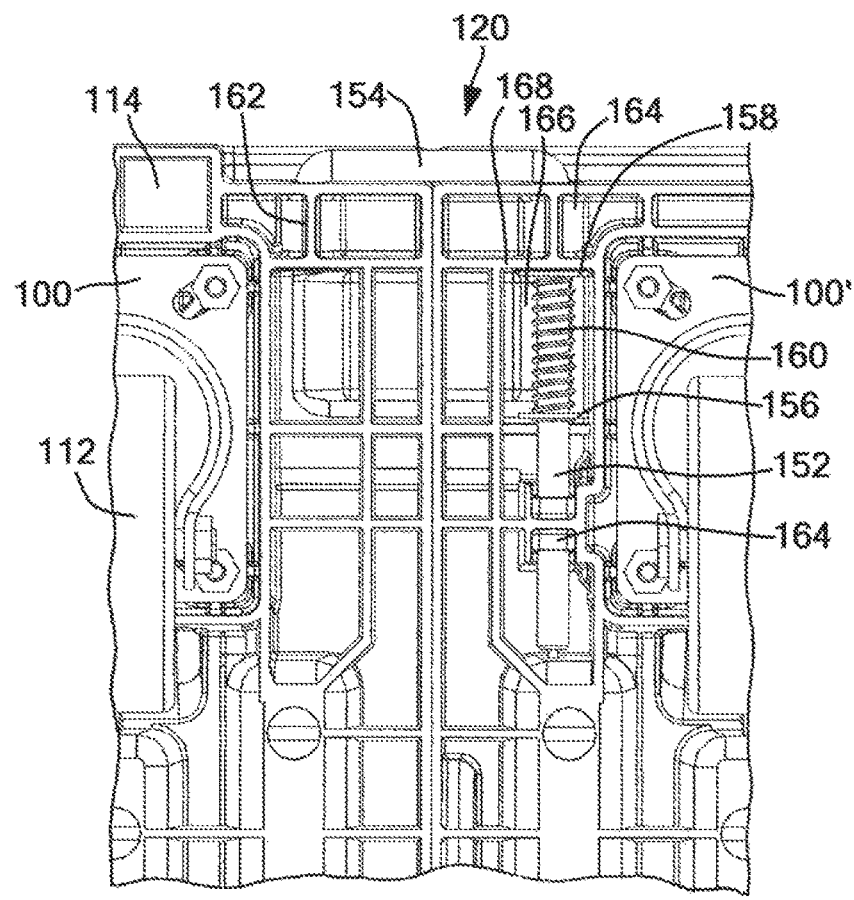
FIG. 9 is a bottom plan view of two dollies in lateral juxtaposition with a J-bar latching mechanism in a deployed position connecting the two dollies.
Figure 10:
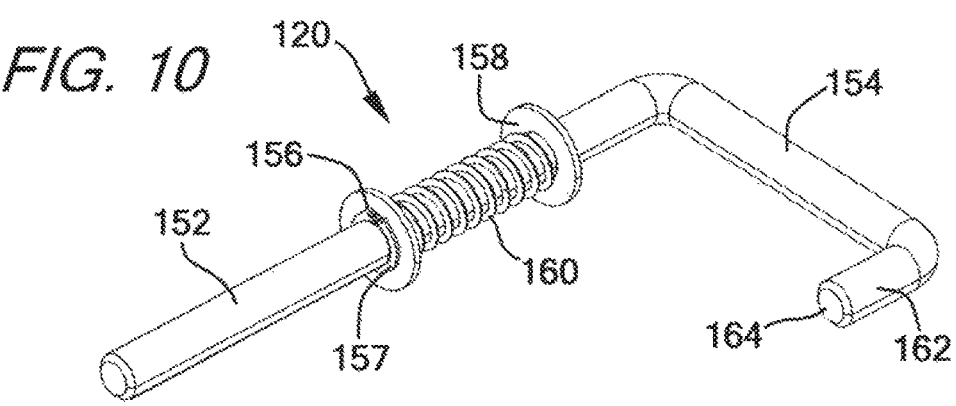
FIG. 10 is a perspective view of a J-bar latching mechanism.

FIG. 9 shows the long leg 152 is connected to the lower surface 114 by walls 164 having aligned openings to receive the long leg 152. A generally rectangular chamber 166 has opposed end walls 168 for containing the spaced flanges 156,158 and the spring 160.

To connect together two dollies 100,100', the second lateral edges 108,108' of each dolly are brought into contact with one another with the end edges 106,106' in registration with the first corner 145 of one dolly 100 positioned next to a second corner 146' of the second dolly 100' and the first corner 145' of the second dolly 100' is next to the second corner 146 of the first dolly 100. A user of the dollies will grasp the J-shaped connector of the first dolly 100 by the short leg 154 and pull it outwardly against the force of the spring 160 to remove the return leg 162 from the second through hole 148 and the short leg is rotated about an axis through the long leg, either clockwise or counterclockwise, and the distal end 164 of the return leg is inserted into the third through hole 149' of the second dolly and the connector is released and the spring pulls the short leg back toward the dolly to releasably connect one pair of corners 145,146'. On the opposed end along the second lateral edge 108, the same is done with the J-shaped connector of the second dolly 100' to connect corners 145',146 to form a double dolly. Notably, two dollies can be releasably connected together without removing any load on the dollies. The double dolly can be moved as a single dolly. The double dolly can be separated into individual dollies by reversing the connection process.

Figure 14:
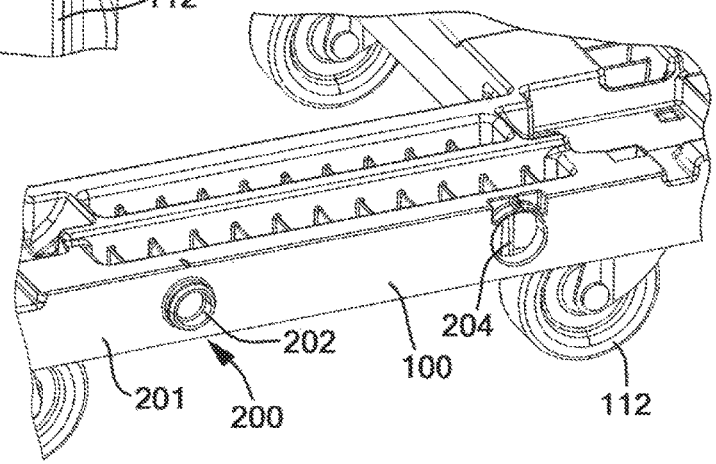
FIG. 14 is a perspective view of an interlock feature on a dolly.
Figure 15:
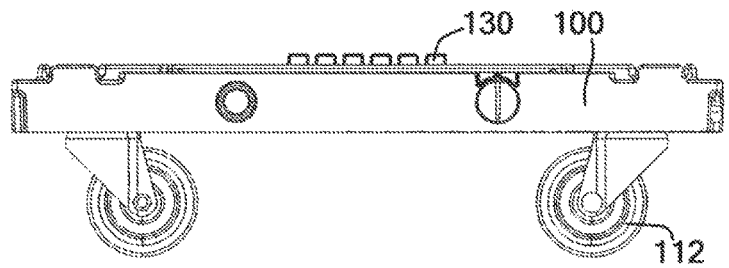
FIG. 15 is a side elevation view of an interlock feature on a dolly.
Figure 16:
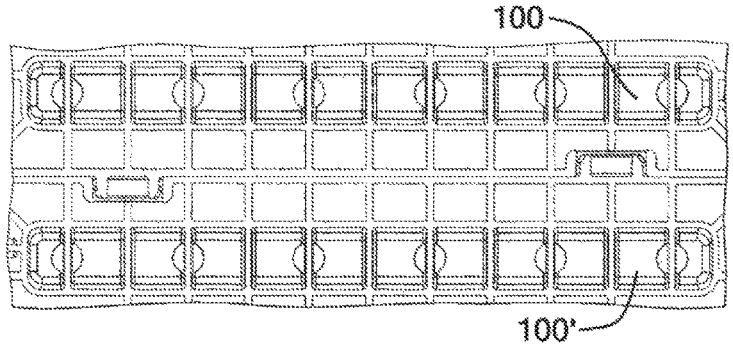
FIG. 16 is a bottom view of two dollies in lateral juxtaposition with the interlocks on the dollies in an engaged position.
Figure 17:
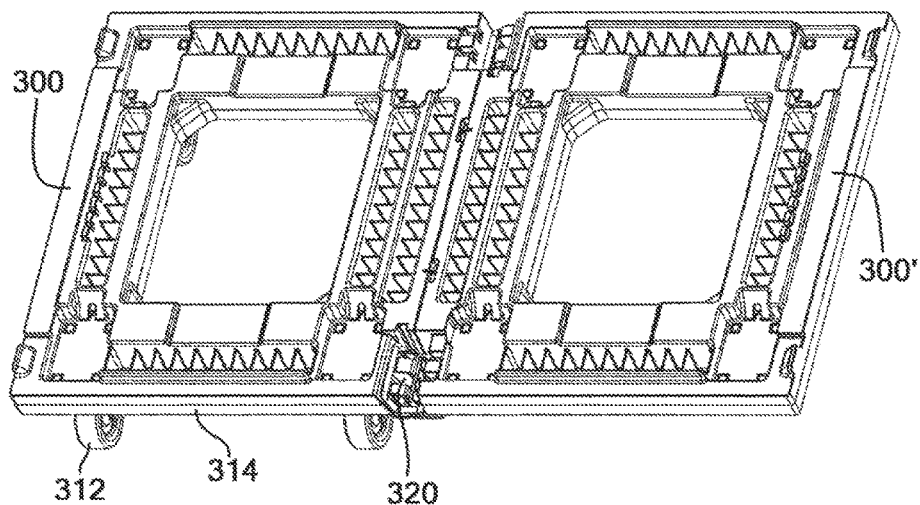
FIG. 17 is a perspective view of a second embodiment of two dollies in lateral juxtaposition connected by a latch-type connector to form a double dolly.
Figure 18:
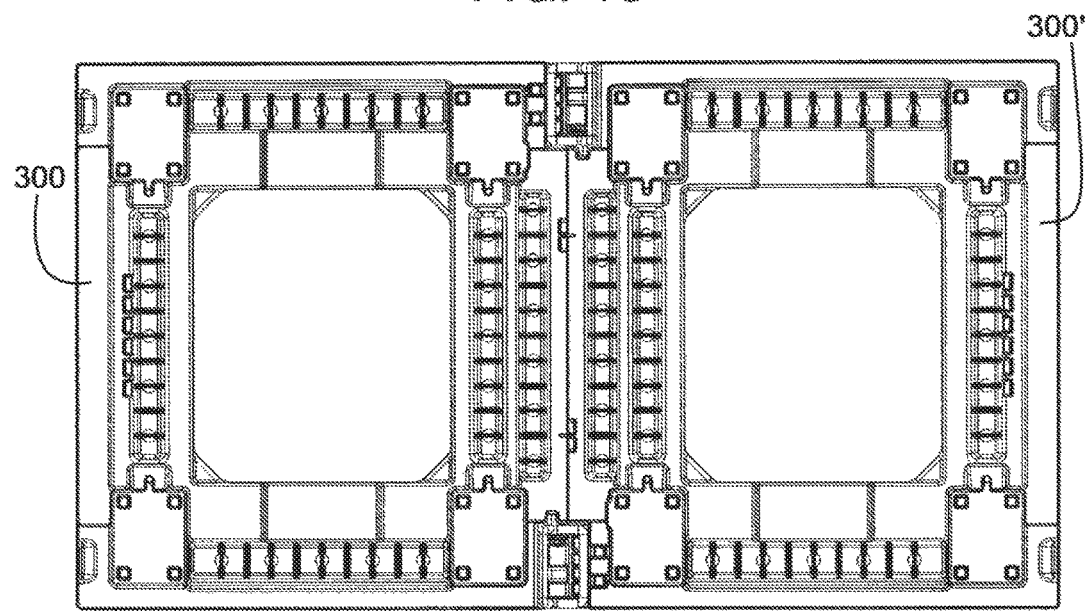
FIG. 18 is a top plan view of the double dolly of FIG. 17.
Figure 25:
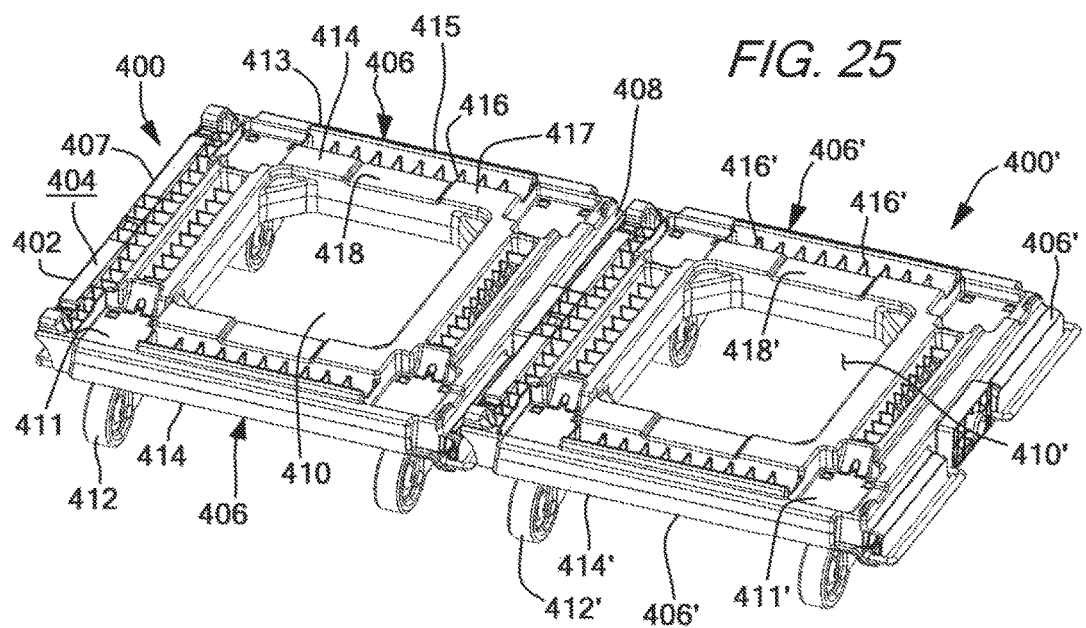
FIG. 25 is a perspective view of another embodiment of two dollies in lateral juxtaposition joined by a connector element in a deployed position to form a double dolly.
Figure 26:
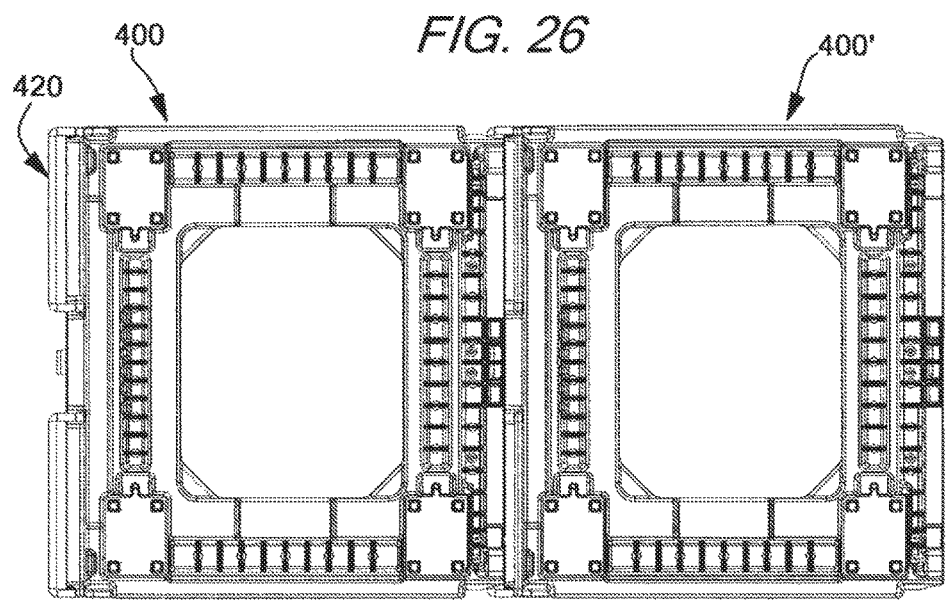
FIG. 26 is a top plan view of the double dolly of FIG. 25.
Figure 27:
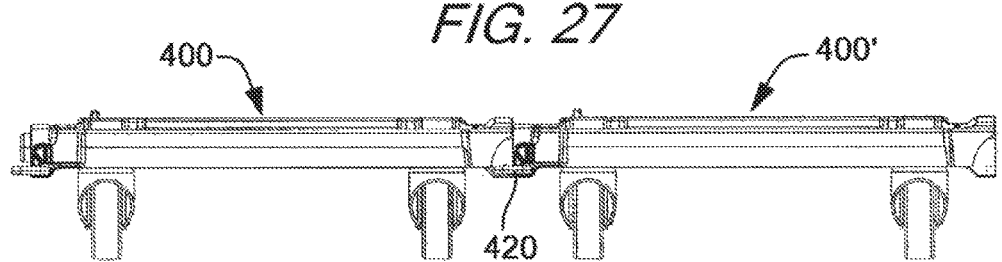
FIG. 27 is a side elevation view of the double dolly of FIG. 25.

FIGS. 14-16 show a dolly having an interlock feature 200 on a lateral edge 201 having a first element 202 of a generally cylindrical member extending outward from the lateral edge and a second element 204 of a generally cylindrical-shaped cutout extending inwardly of the lateral edge. Other shapes can be used such as oval, polygonal, and irregular, for example, so long as they can be interlocked. The interlock feature ensures proper registration and alignment of the lateral edges of two dollies when joined together as shown in FIG. 16.

FIGS. 17-23 show a third embodiment of a connectable dolly 300 and double dolly. The third embodiment differs from the second embodiment by having a generally U-shaped connector element 320. The U-shaped member 320 is pivotally connected to the dolly 300 proximal a peripheral edge and is moveable between a stored position FIG. 22b to a deployed position 22a and FIGS. 17-21.

FIG. 24 shows a single dolly stacked on top of a double dolly.

FIGS. 25-32 show a fourth embodiment of a connectable dolly 400 and double dolly 400, 400' having a platform 402, an upper surface 404, two opposed end edges 406, a first lateral edge 407, a second lateral edge 408 and a centrally disposed aperture 410. Four wells 411 are positioned at corners of the platform and a plurality of caster wheels 412 extend from a bottom surface 414 of the platform. The wells 411 are dimensioned to receive the caster wheels 412 of a similarly configured dolly when in a stacked configuration shown in FIG. 24. An inner and outer retaining wall 413,414 extend along each of the opposed end edges 406 between a pair of adjacent wells 411 and on opposed edges of a channel 415. A plurality of horizontally spaced ribs 416 extend across the channel in a direction generally perpendicular to the end edge 406. The inner retaining wall 414 is castellated having two flanking segments 417 of the same height and a central segment 418 of a lower height.

Figure 29:
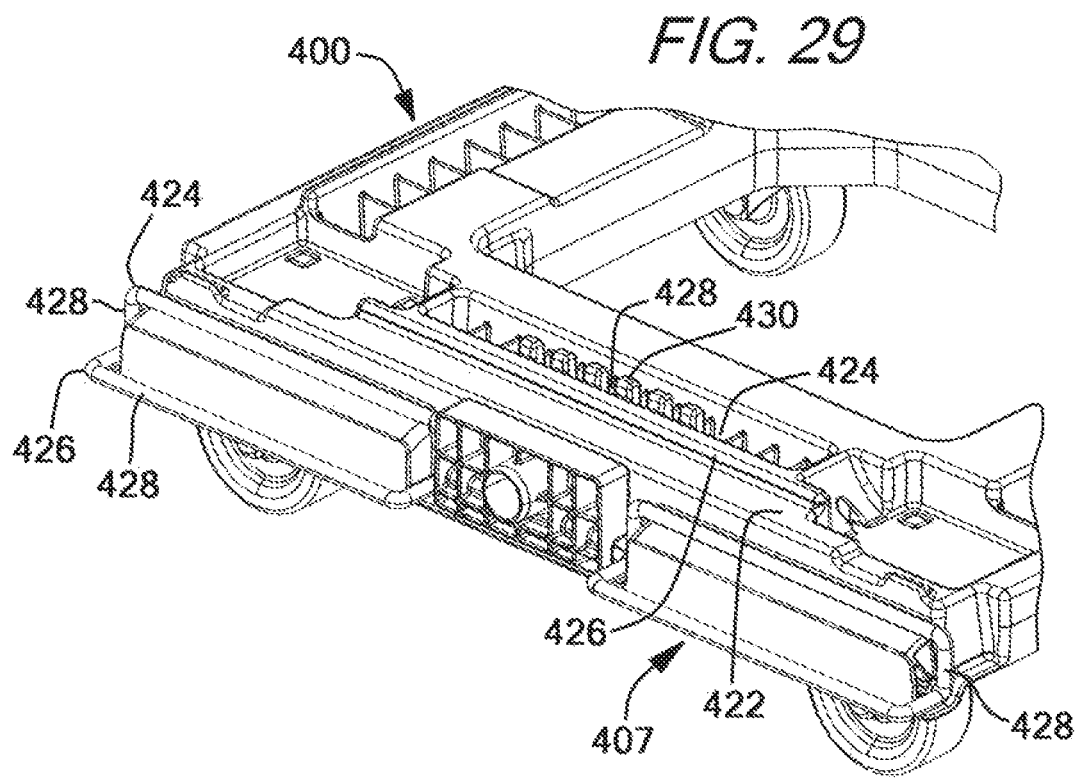
FIG. 29 is a perspective view of a first lateral edge of another embodiment of a dolly.
Figure 30:
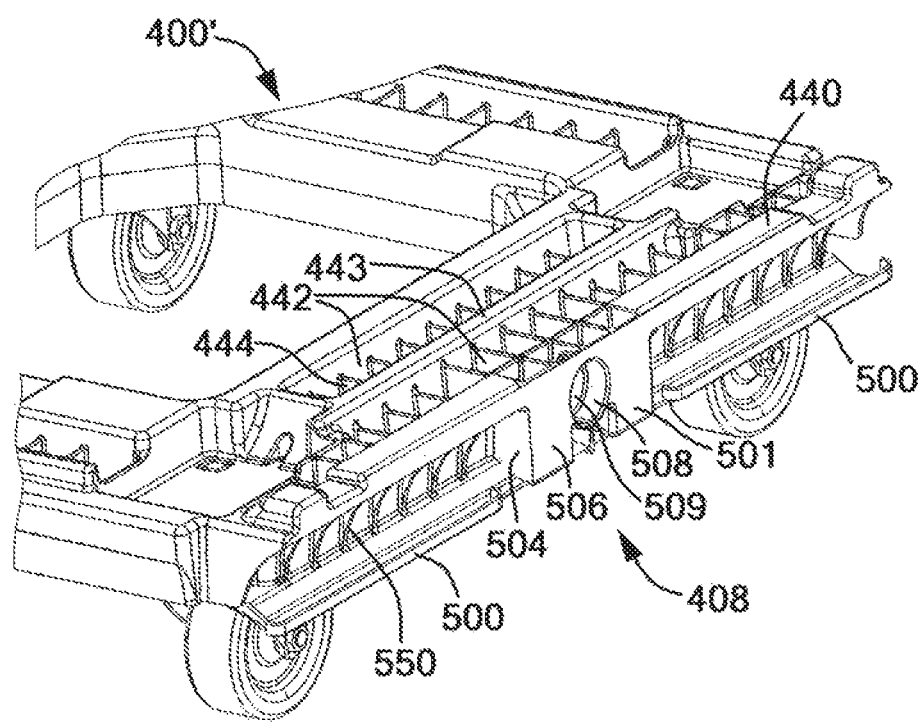
FIG. 30 is a perspective view of an opposite lateral edge of the dolly of FIG. 29.

As best seen in FIGS. 29, 30 the first lateral edge 407 has a centrally disposed, generally rectangular strip 422, and a retaining wall 426 extending to a height above the strip 422. The retaining wall 426 is divided into two segments by a channel 424 having a plurality of horizontally spaced ribs 428 spanning the channel. A plurality of horizontally spaced tabs 430 extend above the retaining wall 426 and are generally rectangular in shape. The second lateral edge 408 has a retaining wall 440 divided into segments by two channels 442 separated by a dividing wall 443. Each channel 442 contains a plurality of horizontally spaced ribs 444 spanning the channel.

Figure 31:
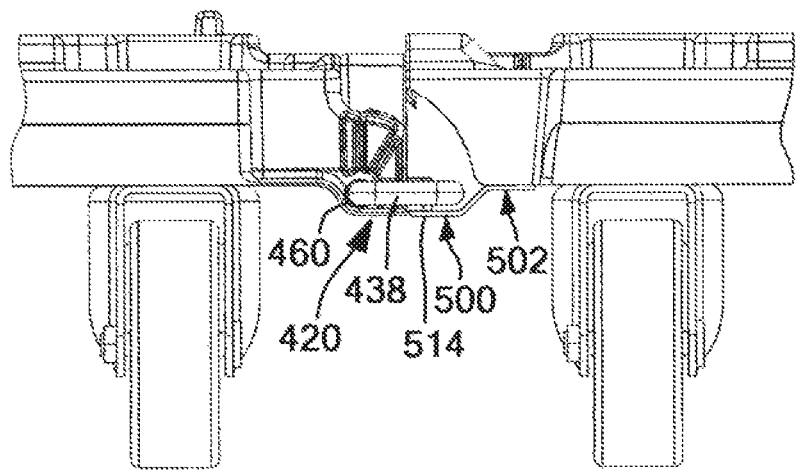
FIG. 31 is an enlarged view of a bail arm latching mechanism of the double dolly of FIG. 25 in an engaged position.
Figure 34:
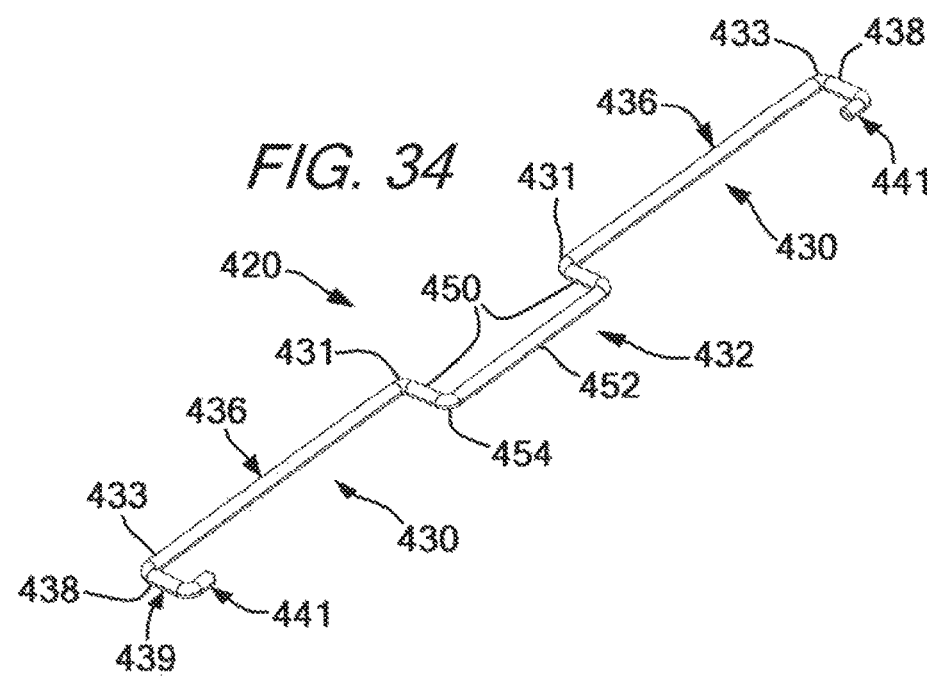
FIG. 34 is a perspective view of a bail arm.
Figure 37:
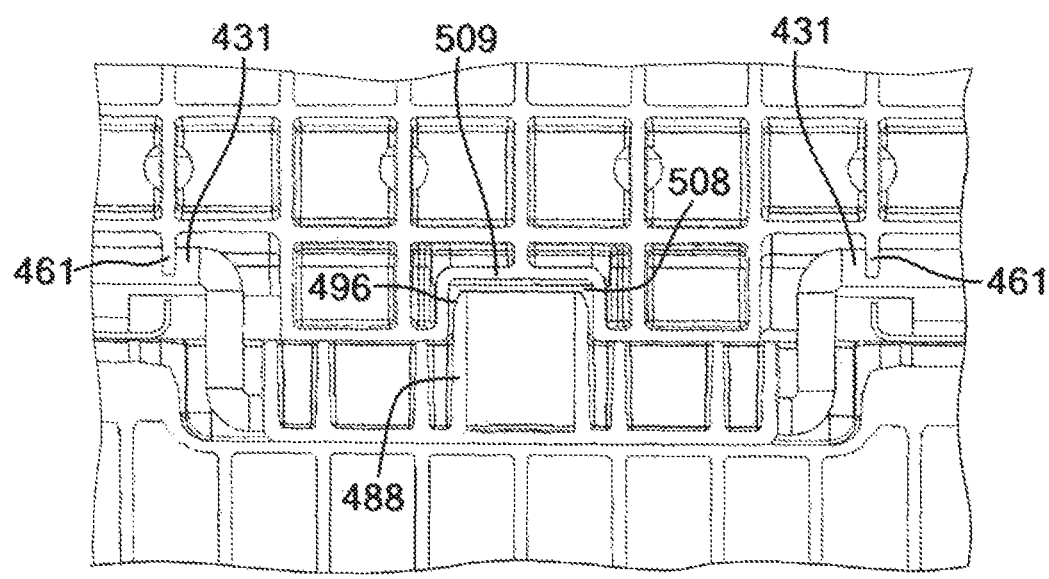
FIG. 37 is a bottom view taken through an intersection of a cylindrical wall 488 extending from a first dolly and engaging a cylindrical chamber 508 on a second dolly to place the dollies in proper alignment for connecting the two together.
Figure 38:
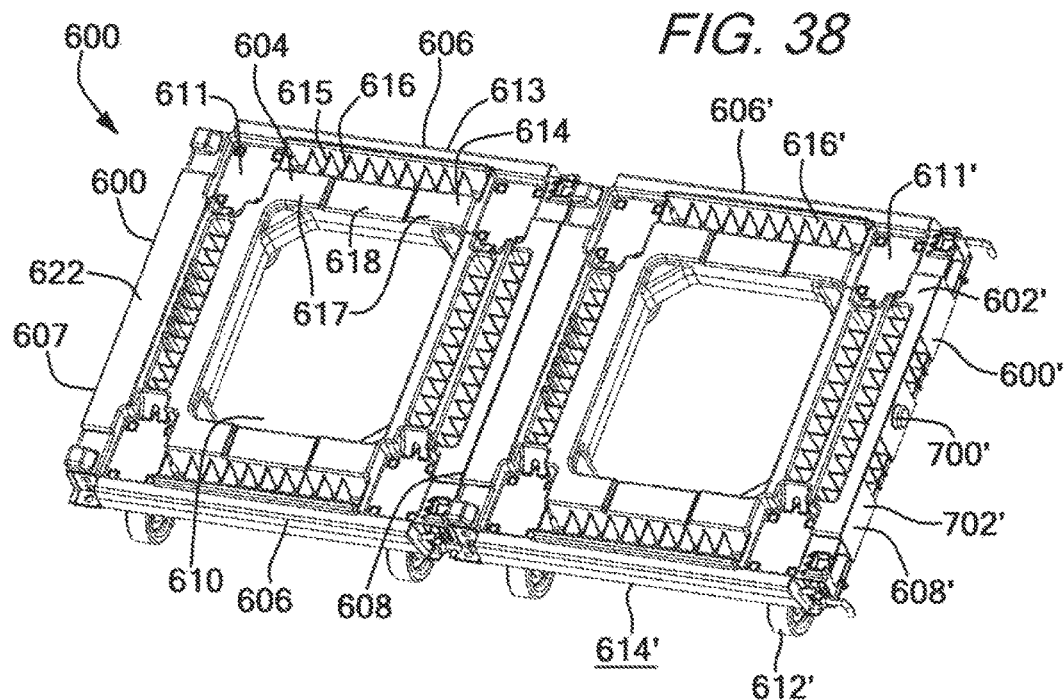
FIG. 38 is a perspective view of another embodiment of two dollies in lateral juxtaposition joined by a connector element shown both in a deployed position and a stored position to form a double dolly.

FIG. 29 shows the first lateral edge 407 has a bail arm 420 and a bail arm retainer 422. Two bail arms are shown, one in a stowed position 424 and another in a deployed position 426. However, only one bail arm is required that is moveable between these positions 424,426. In a preferred form of the invention, the bail arm 420 will extend along roughly the entire length of the first lateral edge 407 and will have opposed ends 428 pivotally mounted to opposed end walls. The bail arm 420 as best seen in FIG. 34 has two opposed J-shaped segments connected together at proximal ends 431 by a generally U-shaped member 432. Each J-shaped segment 430 has an elongate member 436 having the proximal end 431 and a distal end 433 with a return member 438 having a first segment 439 extending transverse to the elongate member 436 and a second segment 441 extending generally parallel to the elongate member and toward the U-shaped member 432. The U-shaped member 432 has two legs 450 one of each extending transversely from one of each of the proximal ends 431 of the J-shaped members and are connected together by a third leg 452 connecting distal ends 454 of the two legs 450. In a preferred form of the invention, the third leg 452 is generally collinear with each of the second segments 441 of the J-shaped member and define an axis of rotation of the bail arm between stowed and deployed positions. The second segments 441 of the J-shaped portion are mounted in a hole 460 through the end wall of the dolly or are otherwise rotatably mounted to the dolly for movement of the bail arm between the stowed (FIG. 32) and deployed positions (FIG. 31). FIG. 37 shows the bail arm is attached to the bottom surface of the dolly with retaining flanges 461.

Figure 33:
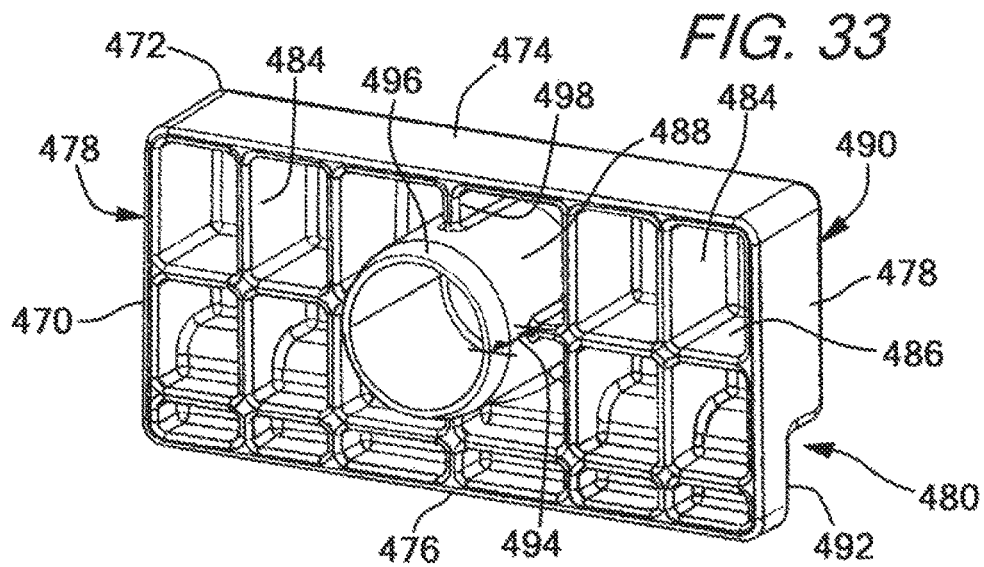
FIG. 33 is a perspective view of a bail arm retainer.

The bail arm retainer 422 as best seen in FIG. 33 is generally a rectangular prism shaped object having a front perimeter wall 470, a rear perimeter wall 472, top and bottom rectangular walls 474,476, respectively, and two opposed rectangular lateral walls 478. The top of the rectangular prism 501 has an opening into a chamber divided by ribs 444. The two opposed lateral walls 478 extend from the top rectangular wall 474 and terminate short of the bottom rectangular wall 476 and define a notch 480. The U-shaped segment 432 of the bail arm is retained in the notch 480 but is rotatable about an axis through the U-shaped portion 432 described above to allow movement of the bail arm from the stowed to the deployed position. An interior chamber of the bail arm retainer 422 has five vertically extending walls 484, and two horizontally extending walls 486 to define 18 subchambers. The subchambers are closed in the back by a segmented rear wall 490,492 with the first segment of the rear wall corresponding to the full depth portion of the rectangular prism and the second rear wall segment 492 corresponding to the notch segment 480. A generally cylindrical wall 488 is generally centrally disposed in four subchambers and extends from the rear wall 490 and axially outward from the front perimeter wall 470 by a distance 494. Of course, walls 488 can be of shapes other than cylindrical without departing from the scope of the present invention. A distal end of the cylindrical wall 488 terminates in an axially outwardly, and radially inwardly tapered, lead-in section 496 having a minimal wall thickness at a distal-most end of the cylindrical wall 488. The cylindrical wall 488 has four walls 498 that attach to an outer surface of the wall 488 and spaced from one another by 90° about an axis of the cylindrical wall.

Figure 36:
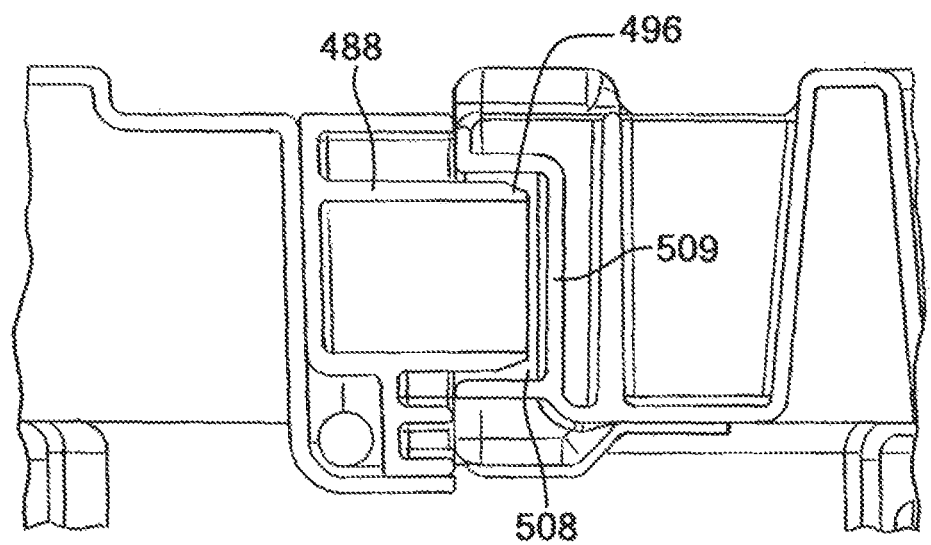
FIG. 36 is a side elevation view taken through an intersection of a cylindrical wall 488 extending from a first dolly and engaging a cylindrical chamber 508 on a second dolly to place the dollies in proper alignment for connecting the two together.

The second lateral edge 408 of the dolly (FIG. 30) has a bail arm latch 500 extending roughly the entire length dimension of the lateral edge 408. A generally, centrally disposed rectangular prism 501 along the lateral edge 408 has a pair of opposed rectangular end walls 504, a rectangular face wall 506 with a centrally disposed circular chamber 508, closed by a back wall 509, dimensioned to receive a portion of the cylindrical wall 488 (FIGS. 36 and 37) to assist in aligning and registering the lateral edges 407 and 408 and in connecting two dollies to form a double dolly.

Figure 28:
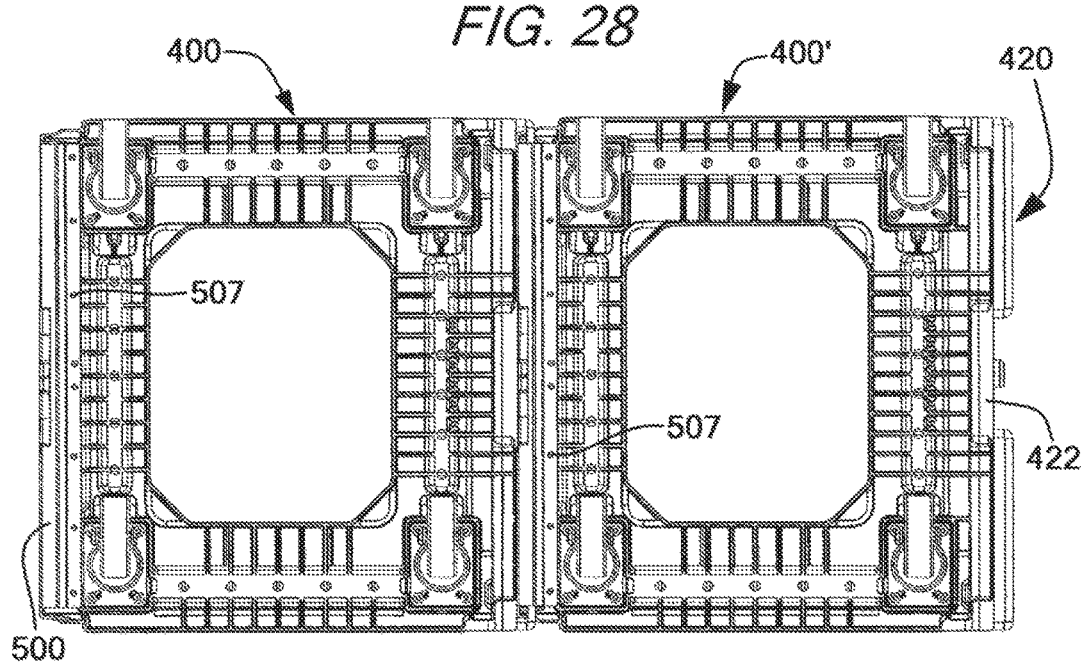
FIG. 28 is a bottom view of the double dolly of FIG. 25.
Figure 35:
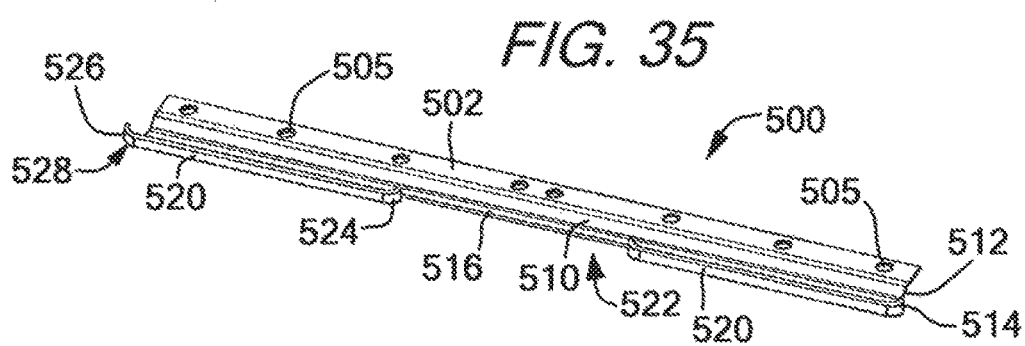
FIG. 35 is a perspective view of a bail arm latch.

As best seen in FIG. 35, the bail arm latch 500 is generally elongate having a length dimension greater than a width and depth dimension and has an attachment flange 502 having a plurality of spaced holes 505 for attaching to an underside surface of the dolly. As shown in FIG. 28, the holes are dimensioned to snap fit to protuberances 507 projecting from a bottom surface of the dolly to fixedly or removably attach the bail arm latch 500 to the dolly. It is contemplated other fastening means could be used such as threaded fasteners, adhesive, brackets or other methodologies well known to those of skill in the art. A generally V-shaped channel 510 extends from the attachment flange 504 and has a series of connected walls including a first radially outwardly extending and downwardly sloping wall 512, a generally horizontally extending bottom wall 514, and a second radially outwardly extending and upwardly sloping wall 516. A pair of horizontally spaced rails 520 extend from the second sloping wall 516 and form a gap 522 between proximal ends 524 of the rails 520. The gap 522 is dimensioned to accommodate the rectangular prism 502. Each of the rails terminates at the proximal end 524 and a distal end 526 with a rounded flange 528. The channel 510 is dimensioned to receive the bail arm 420 when in the deployed position. The rounded flanges contact a top surface of the bail arm 420 to releasably secure the bail arm 420 in the channel 510.

As shown in FIG. 30, a plurality of buttresses 550 extend radially outward from the second lateral edge 408 and assist in retaining the bail arm 420 in the channel 510. If the bail arm moves upwardly, the buttresses 550 contact the bail arm to direct it back into the channel 510.

Figure 32:
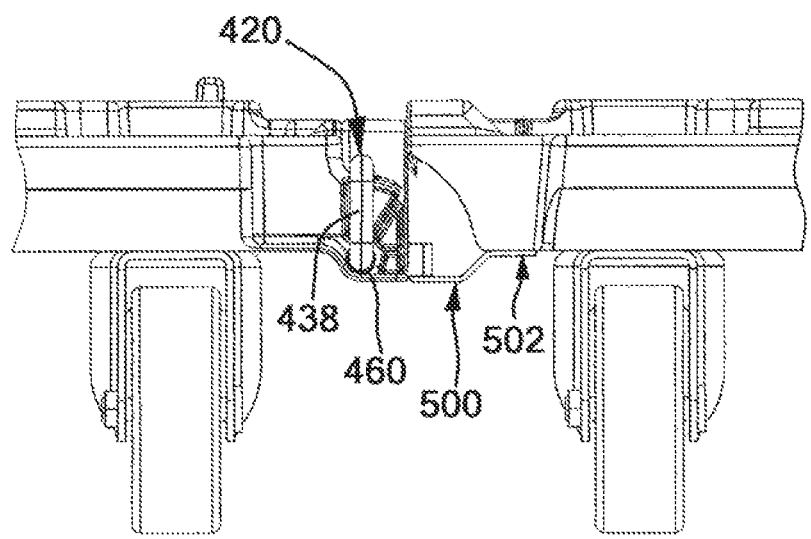
FIG. 32 is an enlarged view of a bail arm latching mechanism of the double dolly of FIG. 25 in an unlocked position.

The process of connecting two dollies to form a double dolly requires placing the first lateral edge 407 of one dolly in lateral juxtaposition to a second lateral edge 408 of a second dolly. The cylindrical wall 488 of the first dolly is inserted into the cylindrical chamber 508 of the second dolly to place the two dollies in proper alignment. Again shapes other than cylindrical could be used without departing from the scope of the present invention. As shown in FIGS. 31 and 32, the bail arm 420 of the first dolly is rotated from the stowed position (FIG. 32) into the V-channel 514 of the bail arm latch of the second dolly to define the deployed position (FIG. 33) and to form a double dolly. The process can be reversed to separate the double dolly into two separate dollies. One of the advantages of the present connectable dollies is that two dollies can be connected together without removing the load from the dollies. Once joined, the dollies can be moved about on their casters as a single dolly.

Figure 40:
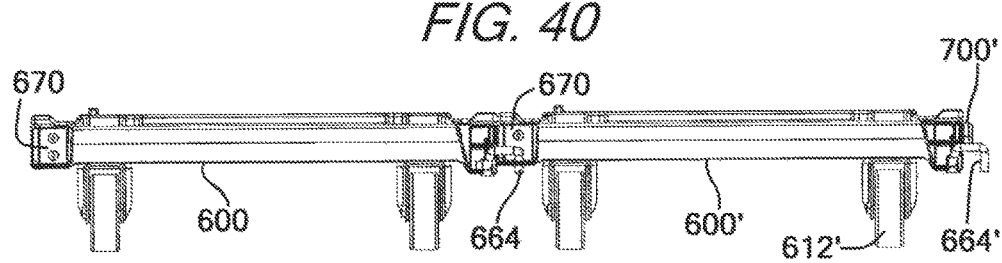
FIG. 40 is a side elevation view of the double dolly of FIG. 38.

As best seen in FIGS. 40, 42 and 45, a pair of bail arm latches 670 are attached to the dolly on the vertical surface 672 extending perpendicularly downwardly from the end edges 606 and proximal the intersection with the first lateral edge 607. The bail arm latch 670 is a generally L-shaped body having a first leg 674 and a second leg 676 extending perpendicularly from a lower end 678 of the first leg 674. A pair of vertically spaced through holes 680 are on the first leg 674 and are dimensioned for receiving fasteners to attach the bail arm latch to the dolly. A bail arm receiving hole 682 extends through the thickness of the second leg 676 and is dimensioned to receive the return segment 662 of the bail arm 650 when the dollies are in a connected position. The bail arm is shown in both a stored position 650a and a deployed position 650b in FIG. 42 for purposes of demonstrating how the bail arm is moveable between these positions through rotation of the bail arm about its axis. However, it should be understood only one bail arm is provided for each dolly.

To ensure proper alignment of two dollies to be connected together by the bail arm, a cylindrical wall 700 extends from a vertical surface 702 of the second lateral wall 608 of a first dolly that is dimensioned to be inserted into a cylindrical shaped chamber 704' in the second lateral wall 607' of a second dolly. Once the cylindrical wall is inserted into the chamber, the bail arm can be rotated to place the return segment 664 through the hole 682 of the bail arm latch on both ends of the dolly to connect the two dollies to define a connected dolly or a double dolly. Once joined, the dollies can be moved about on their casters as a single dolly.

FIGS. 38-47 show a fifth embodiment of a connectable dolly 600 and double dolly 600, 600' having a platform 602, an upper surface 604, two opposed end edges 606, a first lateral edge 607, a second lateral edge 608 and a centrally disposed aperture 610 with triangular shaped flanges 619 in each corner. Four wells 611 are positioned at corners of the platform and a plurality of caster wheels 612 extend from a bottom surface 614 of the platform. The wells 611 are dimensioned to receive the caster wheels 612 of a similarly configured dolly when in a stacked configuration shown in FIG. 24. An inner and outer retaining wall 613,614 extend along each of the opposed end edges 606 between a pair of adjacent wells 611 and on opposed edges of a channel 615. A plurality of horizontally spaced ribs 616 extend across the channel in a direction generally perpendicular to the end edge 606. The inner retaining wall 614 is castellated having two flanking segments 617 of the same height and a central segment 618 of a lower height.

Figure 39:
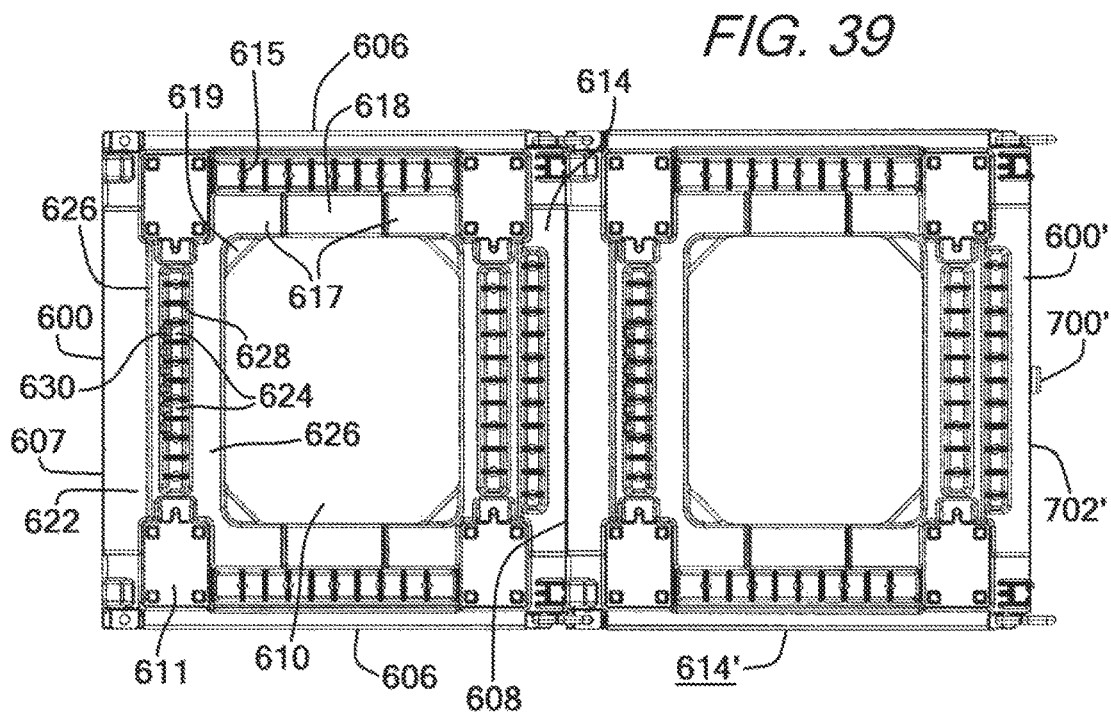
FIG. 39 is a top plan view of the double dolly of FIG. 38.

As best seen in FIG. 39 the first lateral edge 607 has a centrally disposed, generally rectangular strip 622, and a retaining wall 626 extending to a height above the strip 622. The retaining wall 626 is divided into two segments by a channel 624 having a plurality of horizontally spaced ribs 628 spanning the channel. A plurality of horizontally spaced tabs 630 extend above the retaining wall 626 and are generally rectangular in shape. The second lateral edge 608 has a retaining wall 640 divided into segments by two channels 642 separated by a dividing wall 643. Each channel 642 contains a plurality of horizontally spaced ribs 644 spanning the channel.

Figure 41:
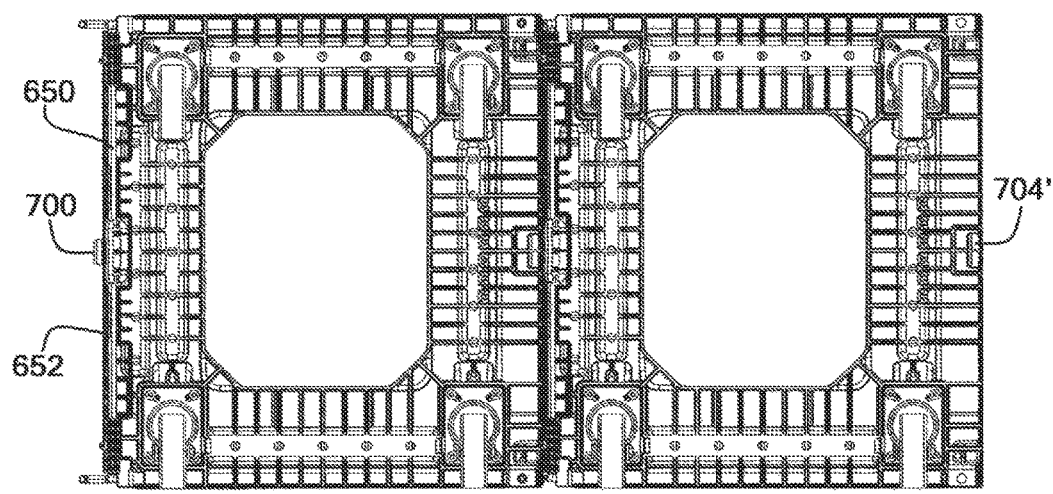
FIG. 41 is a bottom view of the double dolly of FIG. 38.
Figure 46:
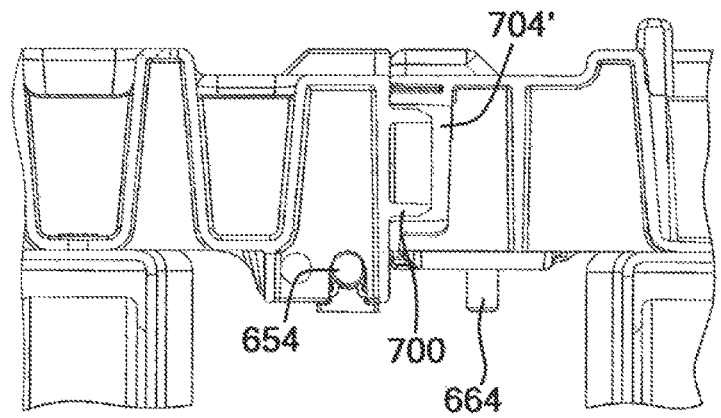
FIG. 46 is a side elevation view taken through an intersection of a cylindrical wall extending from a first dolly and engaging a cylindrical chamber on a second dolly to place the dollies in proper alignment for connecting the two together.
Figure 47:
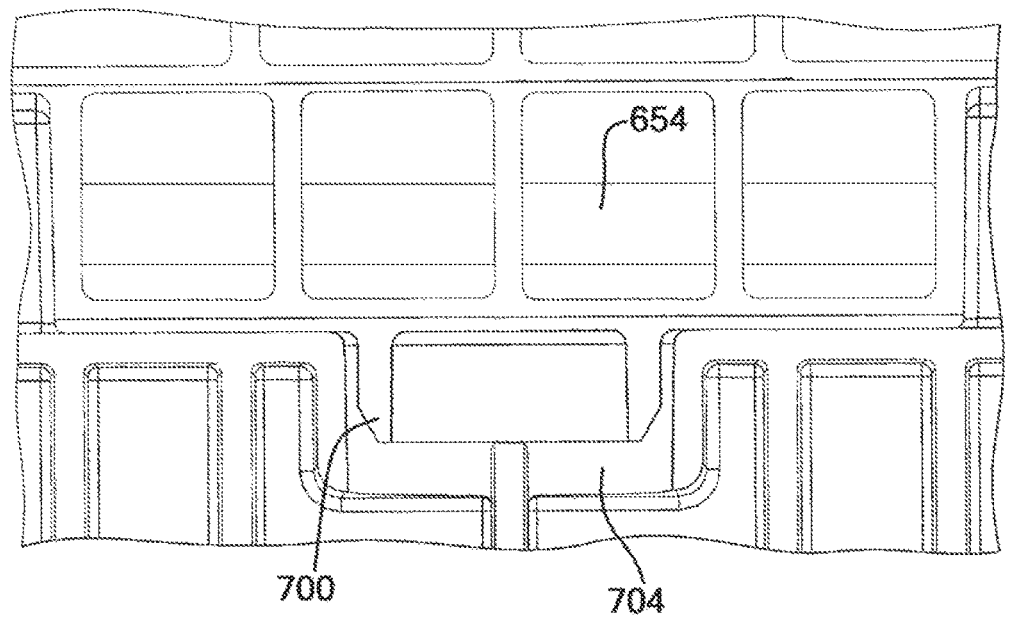
FIG. 47 is a bottom view taken through an intersection of a cylindrical wall extending from a first dolly and engaging a cylindrical chamber on a second dolly to place the dollies in proper alignment for connecting the two together.

FIGS. 40-42 show a bail arm 650 (FIG. 44) mounted on the undersurface 614 of the dolly and is held against a surface 653 of a bail arm retainer 652 (FIG. 43) to allow for rotational movement of the bail arm 650 about an axis extending longitudinally therethrough. The bail arm 650 extends roughly the entire length of the second lateral edge 608 and has an elongate bar 654 having opposed ends 656. A segmented, generally N-shaped member 658 extends from both opposed ends, and each N-shaped member 658 having a first riser segment 660 extending perpendicularly to the axis, a horizontal segment 662 extending perpendicularly from a top of the horizontal segment, and a return segment 662 extending perpendicularly downwardly and having a length dimension greater than a length dimension of the riser segment 660. The bail arm preferably has a circular shape in horizontal cross-sectional dimension.

As best seen in FIGS. 40, 42 and 45, a pair of bail arm latches 670 are attached to the dolly on the vertical surface 672 extending perpendicularly downwardly from the end edges 606 and proximal the intersection with the first lateral edge 607. The bail arm latch 670 is a generally L-shaped body having a first leg 674 and a second leg 676 extending perpendicularly from a lower end 678 of the first leg 674. A pair of vertically spaced through holes 680 are on the first leg 674 and are dimensioned for receiving fasteners to attach the bail arm latch to the dolly. A bail arm receiving hole 682 extends through the thickness of the second leg 676 and is dimensioned to receive the return segment 662 of the bail arm 650 when the dollies are in a connected position. The bail arm is shown in both a stored position 650a and a deployed position 650b in FIG. 42 for purposes of demonstrating how the bail arm is moveable between these positions through rotation of the bail arm about its axis. However, it should be understood only one bail arm is provided for each dolly.

To ensure proper alignment of two dollies to be connected together by the bail arm, a cylindrical wall 700 extends from a vertical surface 702 of the second lateral wall 608 of a first dolly that is dimensioned to be inserted into a cylindrical shaped chamber 704' in the second lateral wall 607' of a second dolly. Once the cylindrical wall is inserted into the chamber, the bail arm can be rotated to place the return segment 664 through the hole 682 of the bail arm latch on both ends of the dolly to connect the two dollies to define a connected dolly or a double dolly. Once joined, the dollies can be moved about on their casters as a single dolly.

FIGS. 48-62 show a sixth embodiment of a connectable dolly 800 and double dolly 800, 800' having a platform 802, an upper surface 804, two opposed end edges 806, a first lateral edge 807, a second lateral edge 808 and a centrally disposed aperture 810 with triangular shaped flanges 819 in each corner. Four wells 811 are positioned at corners of the platform and a plurality of caster wheels 812 extend from a bottom surface 814 of the platform. The wells 811 are dimensioned to receive the caster wheels 812 of a similarly configured dolly when in a stacked configuration shown in FIG. 24. An inner and outer retaining wall 813,814 extend along each of the opposed end edges 806 between a pair of adjacent wells 811 and on opposed edges of a channel 815. A plurality of horizontally spaced ribs 816 extend across the channel in a direction generally perpendicular to the end edge 806. The inner retaining wall 814 is castellated having two flanking segments 817 of the same height and a central segment 818 of a lower height.

Figure 49:
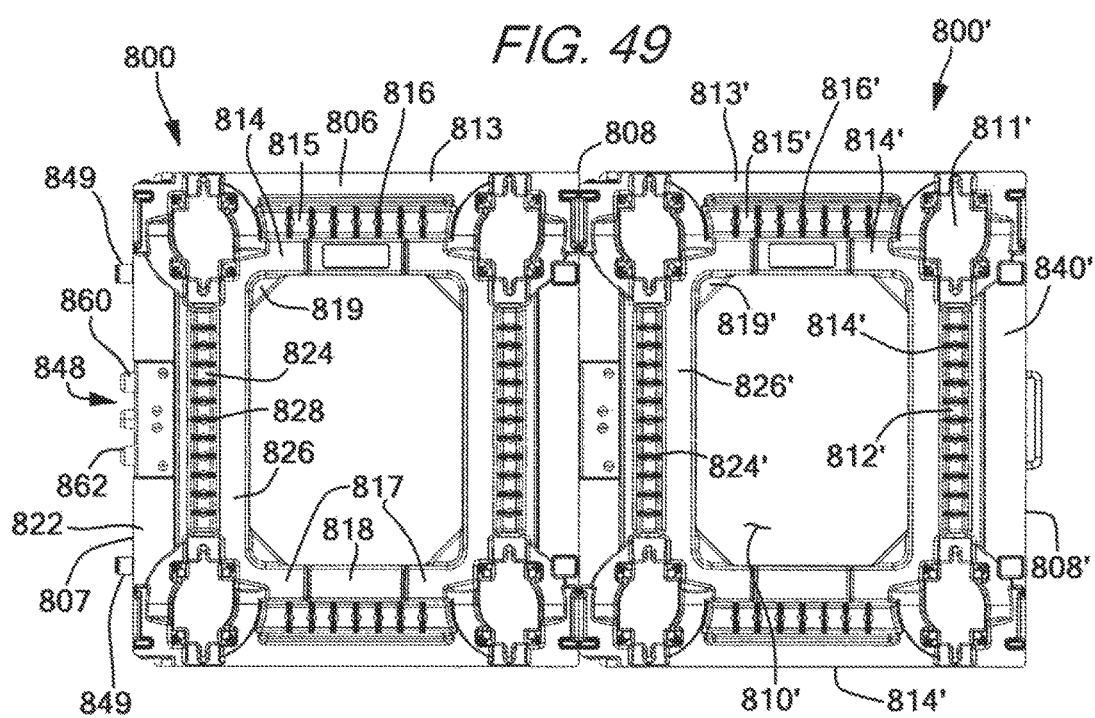
FIG. 49 is a top plan view of the double dolly of FIG. 48.
Figure 50:
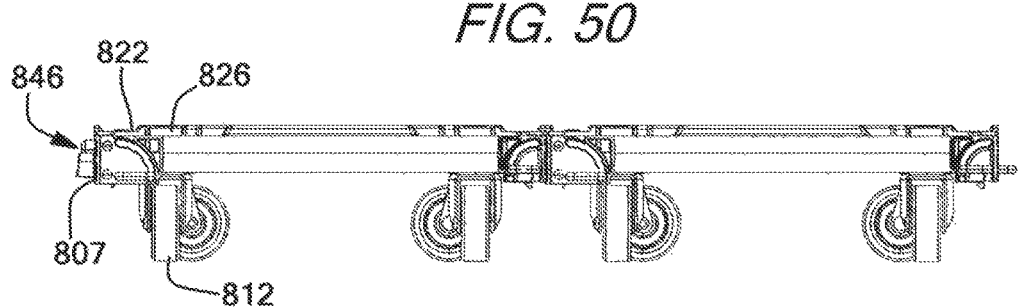
FIG. 50 is a side elevation view of the double dolly of FIG. 48.

As best seen in FIG. 49 the first lateral edge 807 has a centrally disposed, generally rectangular strip 822, and a retaining wall 826 extending to a height above the strip 822. The retaining wall 826 is separated from the strip 822 by a channel 824 having a plurality of horizontally spaced ribs 828 spanning the channel. The second lateral edge 808 has a retaining wall 840 divided into segments by a channel 842. The channel 842 contains a plurality of horizontally spaced ribs 844 spanning the channel.

A vertical wall 846 of the first lateral edge 807 has an interlock 847 having three central, horizontally spaced cylindrical posts 848 flanked by two flanking posts 849. A generally L-shaped reinforcing plate 850 best seen in FIG. 59, has a top flange 852 and a side flange 854. The top flange has a plurality of through holes 856 to accommodate fasteners for attaching to the strip 822. The side flange 854 has three horizontally spaced circular through holes 858 that fit over the three central posts. The central posts 848 are segmented having a base segment 860 with a radially inwardly tapering distal end 862 to act as a lead-in when docking to corresponding chambers 861' in the lateral edge 808. The flanking posts 849 has a distal end 864 that slopes axially outwardly from a top edge to a bottom edge to form a lead-in when docking to the chambers 865'. The flanking posts 849 extend axially outwardly from the vertical wall 846 a greater distance than do the central posts 848 and, as will be described below, engage portions of a bail arm to cause another portion of the bail arm to move toward and into an engaged position when the dollies are locked together.

Figure 51:
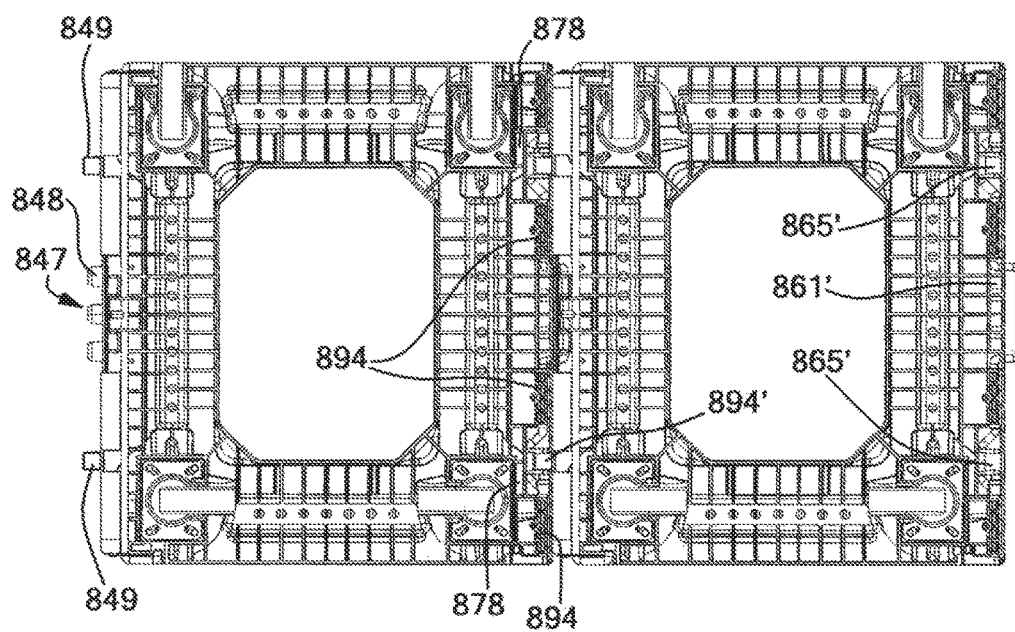
FIG. 51 is a bottom plan view of the double dolly of FIG. 48.

Each dolly has two bail arms one of each that extend along opposed lateral edges 807 and 808. FIGS. 55 and 56 respectively show a first bail arms 870 that extends along the first lateral edge 807 and the second bail arm 872 that extends along the second lateral edge 808. The first bail arm 870 engages a second bail arm 872' when the dollies are engaged as shown in FIG. 51. The first bail arm 870 is segmented having a central generally U-shaped central segment 874, and moving axially outwardly, is connected at opposed ends to two flanking retainer segments 876, followed by two U-shaped activating segments 878, followed by two more retainer segments 876. The retainer segments engage a top surface 895 of a retainer part 894 shown in FIG. 54, and the retainer part 894 is secured to an underside of the dolly using flange 896. Flange 896 has a throughole to accept a threaded fastener to attach the retainer part 894 to the dolly and to form a support for the first bail arm. As shown in FIG. 51, there are four retainer parts 894, one for each of the retainer segments 876.

Three parallel centerlines can be drawn through the first bail arm. The first centerline 882 extends through section 881. A second centerline 884 extends through activating segments 882. A third centerline 886 can be drawn through the retainer segments 876. The terminal segments 878 have a riser segment 885 extending perpendicularly away from the first centerline and terminating in a latch-plate-engaging segment 886 that is perpendicular from the riser and extends axially inwardly toward the central U-shaped segment. A fourth centerline 888 extends through the segments 886 and forms an axis of rotation of the first bail arm.

The first bail arm is attached to a bottom surface of the dolly with four bail arm retainer bodies 894 spaced between ends 806 having a concave upper surface 895 and a flange 896 for attaching the retainer body 894 to an underside surface of the dolly. As best seen in FIG. 51, the retainer bodies support retainer segments 876 of the bail arm.

FIGS. 57 and 58 show hardware for mounting the second bail arm to the dolly. A bail arm retainer plate 897 has an arcuate bail arm guide surface 898, two through holes 899 for accepting threaded fasteners to attach the plate 897 to the dolly, and a third through hole 867 for receiving the second bail arm and supporting it for rotation. The arcuate guide surface 898 has a protuberance 868 that forms a pocket 869. The pocket 869 holds the bail arm in position when the dollies are engaged (FIG. 52) to prevent the second bail arm from vibrating out of position.

FIG. 58 shows a generally L-shaped bail arm retainer plate 830 having a first flange 831 and a second flange 832 perpendicular to one another. The first flange has a through hole 833 for receiving the second bail arm and the second flange has a through hole for receiving a threaded fastener to attach the bail arm retainer plate 830 to an underside of the dolly.

The second bail arm 872 has an elongate central section 889, a centrally disposed boss 891 extending perpendicularly away therefrom, and two U-shaped terminal sections 893.

Figure 48:
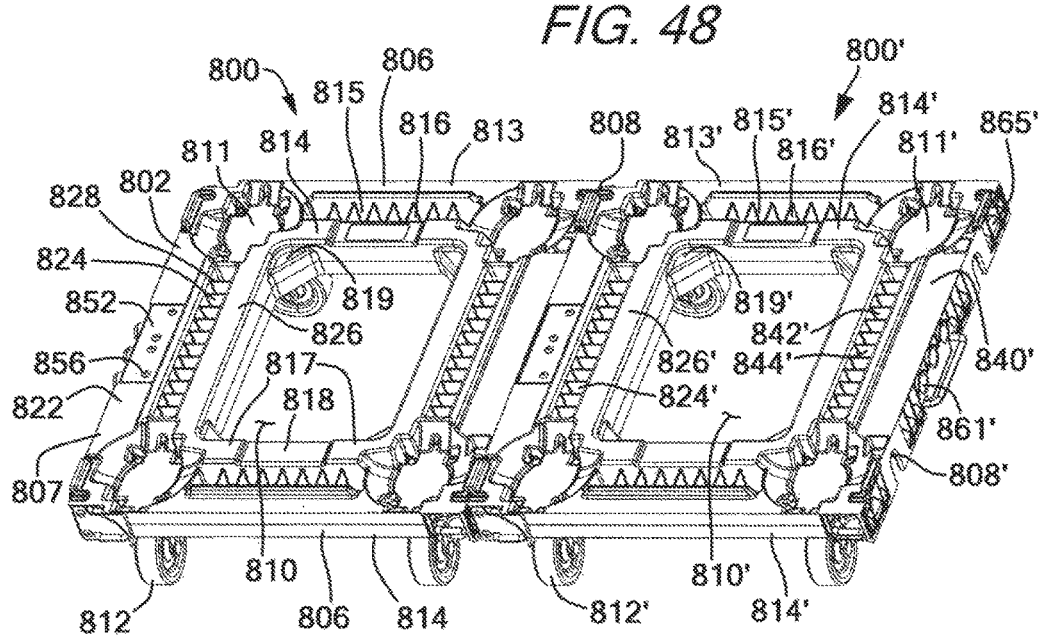
FIG. 48 is a perspective view of another embodiment of a double dolly.
Figure 52:
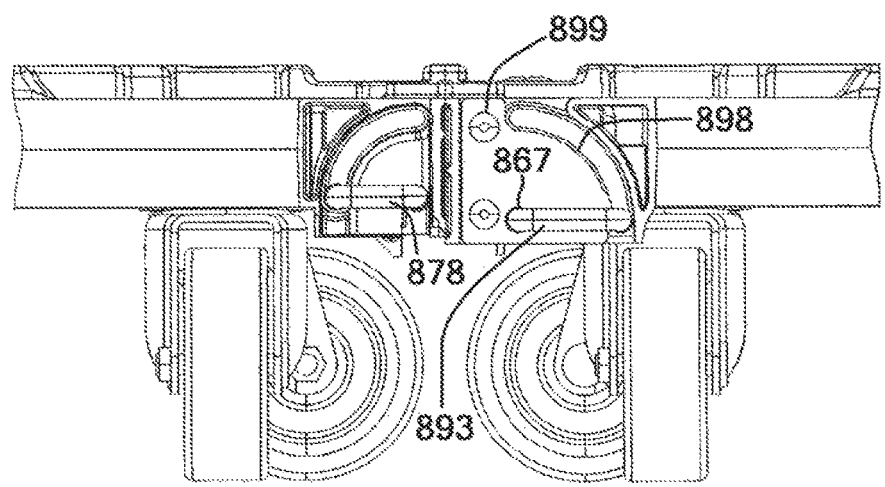
FIG. 52 is an enlarged side elevation view of a portion the double dolly of FIG. 48.
Figure 53:
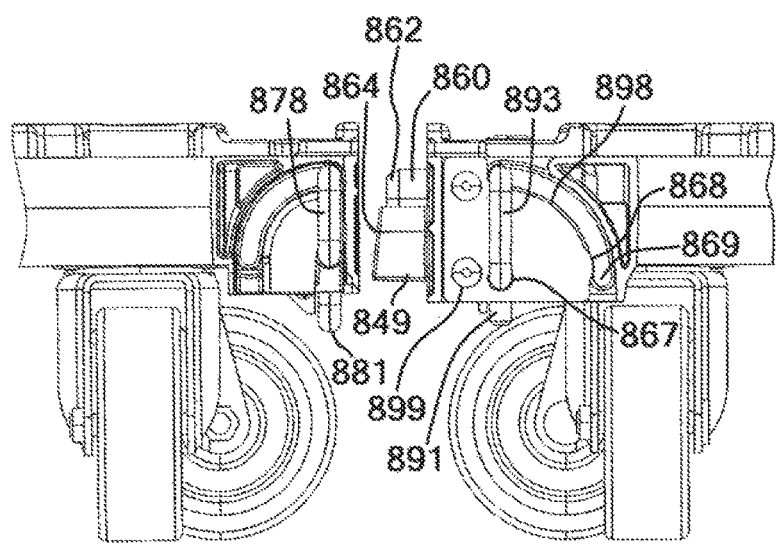
FIG. 53 is an enlarged side elevation view of a portion the double dolly of FIG. 48 with the dollies separated.
Figure 54:
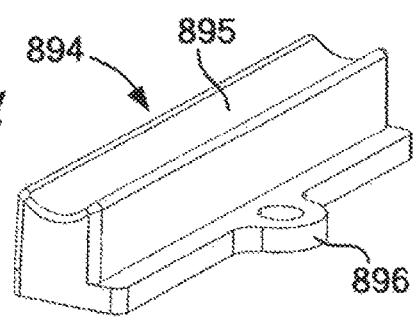
FIG. 54 is a perspective view of a bail arm retainer.

In operation, two similarly configured dollies shown in FIG. 48 are brought into alignment with a second lateral edge 808 positioned in close proximity to a first lateral edge 807' and the flanking posts 849' are brought into contact with the activating segments 878 of the bail arm. The first bail arm rotates about axis 886 and the U-shaped end 878 moves from the position in FIG. 53 to the engaged position of FIG. 52. The U-shaped end segment 893 of the second bail arm is moved into the engaged position of FIG. 52 to lock the dollies together. The central segment 881 of the first bail arm swings into a channel 835 (FIG. 61) in the underside of the dolly and is held in place by the boss 891 (FIGS. 61 and 62) which in turn is secured in place by the engagement of U-shaped segment 893 in pocket 869 as shown in FIG. 52.

FIGS. 63-74 show a seventh embodiment of a connectable dolly 900 and double dolly 900, 900' having a platform 902, an upper surface 904, two opposed end edges 906, a first lateral edge 907, a second lateral edge 908 and a centrally disposed aperture 910 with triangular shaped flanges 919 in each corner. Four wells 911 are positioned at corners of the platform and a plurality of caster wheels 912 extend from a bottom surface 914 of the platform. The wells 911 are dimensioned to receive the caster wheels 912 of a similarly configured dolly when in a stacked configuration shown in FIG. 24. An outer and inner retaining wall 913,914 extend along each of the opposed end edges 906 between a pair of adjacent wells 911 and on opposed edges of a channel 915. A plurality of horizontally spaced ribs 916 extend across the channel in a direction generally perpendicular to the end edge 906. The inner retaining wall 914 is castellated having two flanking segments 917 of the same height and a central segment 918 of a lower height.

Figure 64:
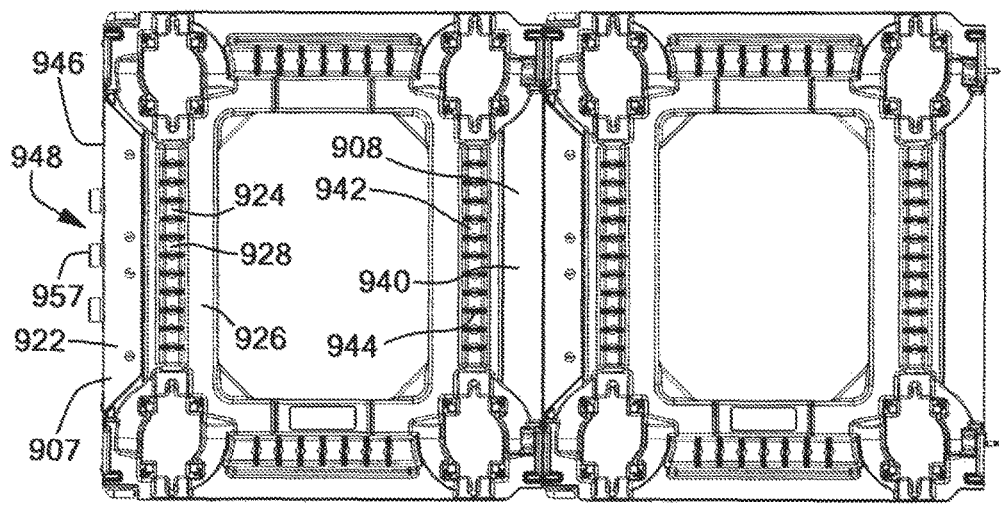
FIG. 64 is a top plan view of the double dolly of FIG. 63.
Figure 65:
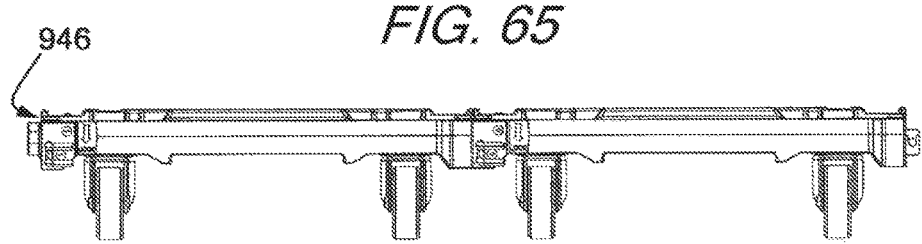
FIG. 65 is a side elevation view of the double dolly of FIG. 63.
Figure 66:
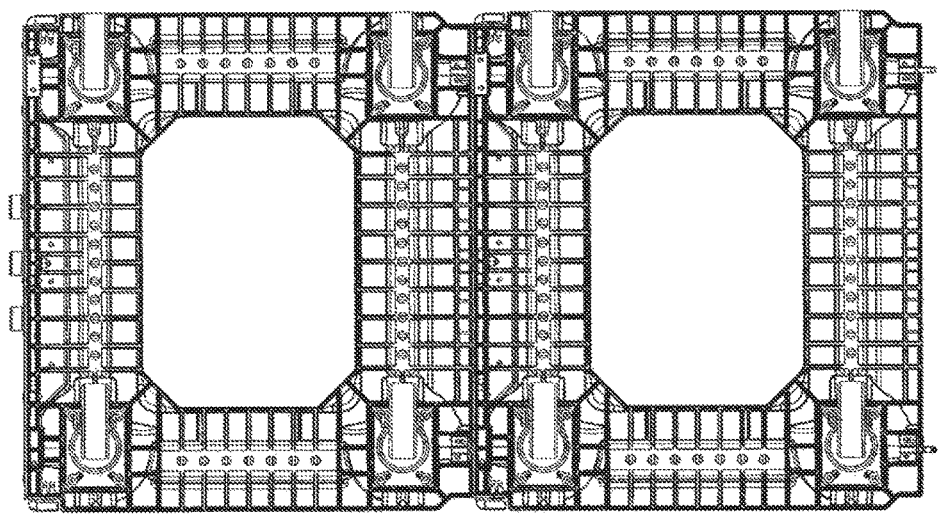
FIG. 66 is a bottom plan view of the double dolly of FIG. 63.

As best seen in FIG. 64 the first lateral edge 907 has a centrally disposed, generally rectangular strip 922, and a retaining wall 926 extending to a height above the strip 922. The retaining wall 926 is separated from the strip 922 by a channel 924 having a plurality of horizontally spaced ribs 928 spanning the channel. The second lateral edge 908 has a retaining wall 940 divided into segments by a channel 942. The channel 942 contains a plurality of horizontally spaced ribs 944 spanning the channel.

A vertical wall 946 of the first lateral edge 907 has a bail arm center retainer plate 947 (See also FIG. 72) having three central, horizontally spaced cylindrical posts 948 flanked by two windows 949. The bail arm center retainer plate 947 is generally L-shaped and has a top flange 952 and a side flange 954. The top flange has a plurality of through holes 956 to accommodate fasteners for attaching to the strip 922. The central cylindrical post has a through hole 957 to accommodate a nut 958 (FIG. 74) secured to a threaded bolt 959 that attaches a bail arm 960 to the dolly. The flanking windows 949 provide access to two U-shaped latches 961 to operatively engage a portion of the bail arm 960 to connect two dollies together.

Figure 69:
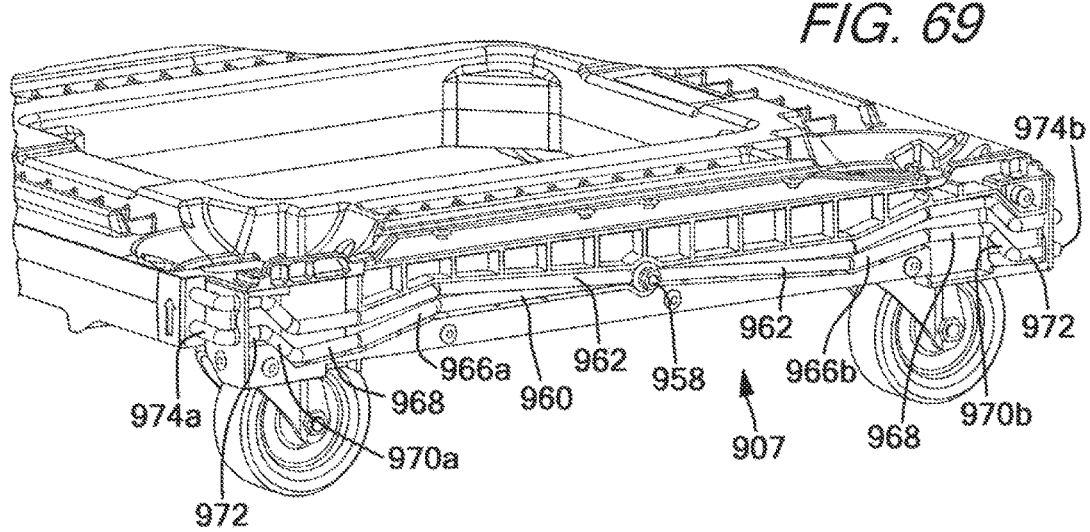
FIG. 69 is a side elevation view with a bail arm center retainer plate removed to show a bail arm.
Figure 70:
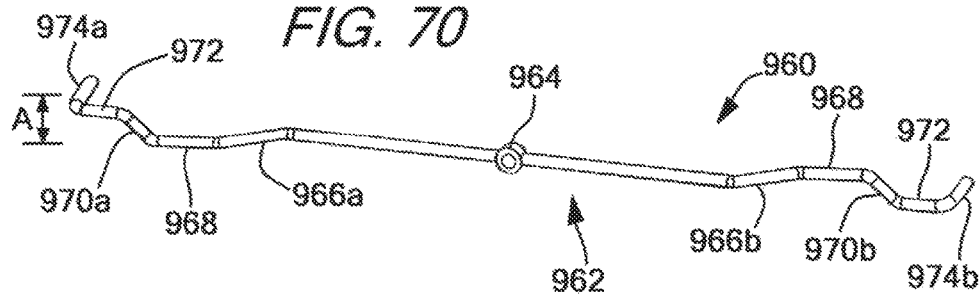
FIG. 70 is a perspective view of a bail arm.

FIG. 69 shows the first lateral edge 907 with the bail arm center retainer plate 947 removed to show the underlying bail arm 960. Only a single bail arm is present and it is shown in both engaged and disengaged positions. FIG. 70 shows the bail arm 960 has an elongate central portion 962 with a central hub 964 for receiving the threaded bolt 959.

The next segment 966 moving outwardly has segment 966a slanting downwardly while segment 966b slopes upwardly. The next segment 968 extends parallel to the central elongate segment. The next segment 970, segment 970a extends upwardly and segment 970b extends downwardly. The next segment 972 extends parallel to the central segment and the next segment 974 extends perpendicularly in the same direction from segment 972. Segment 974a is higher than 974b by a distance designated A.

Figure 63:
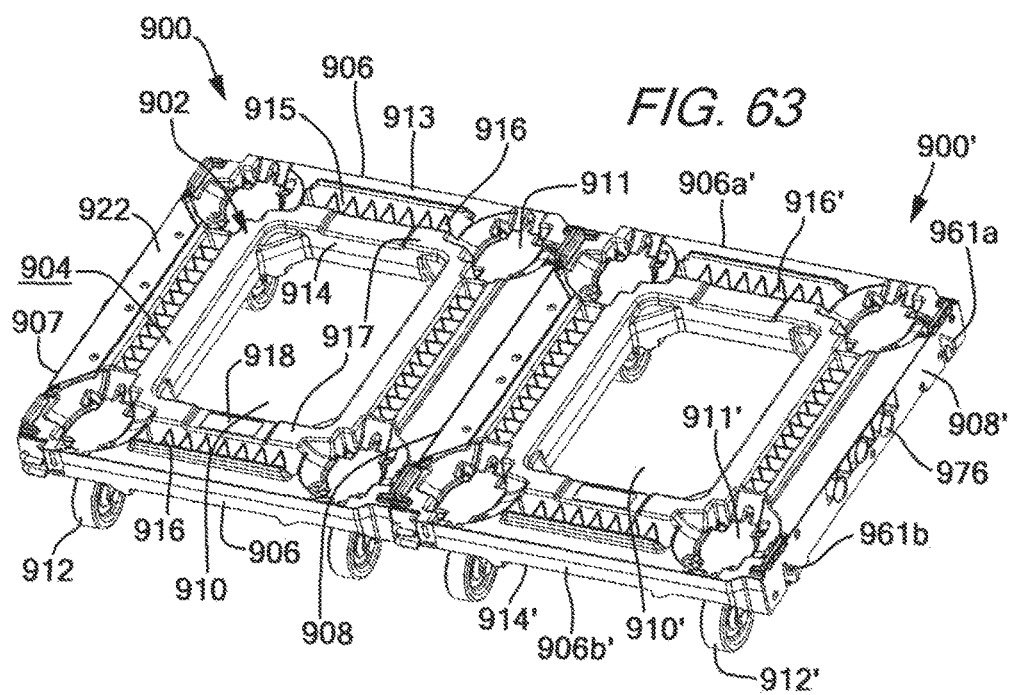
FIG. 63 is a perspective view of another embodiment of a double dolly.
Figure 67:
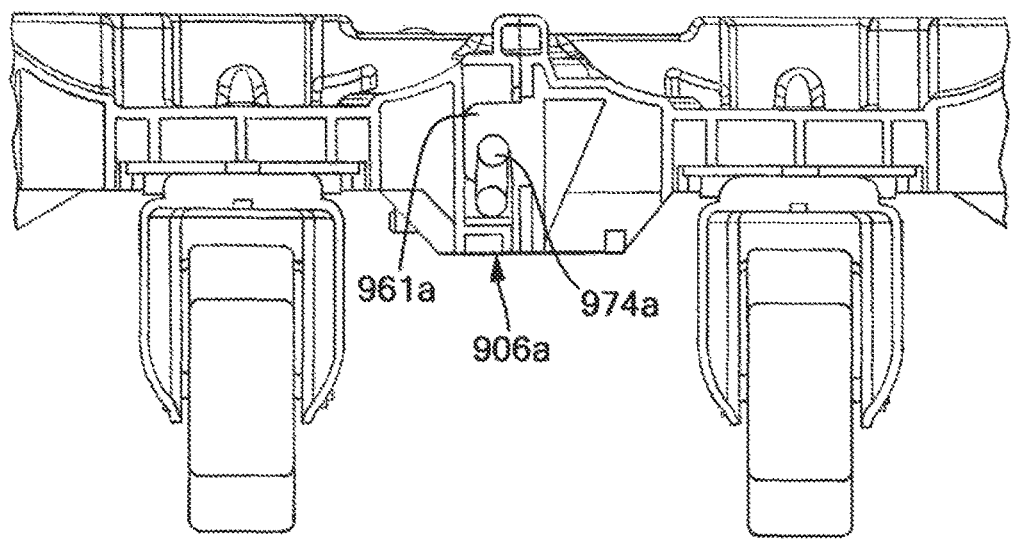
FIG. 67 is an enlarged view of one edge of the double dolly of FIG. 63.
Figure 68:
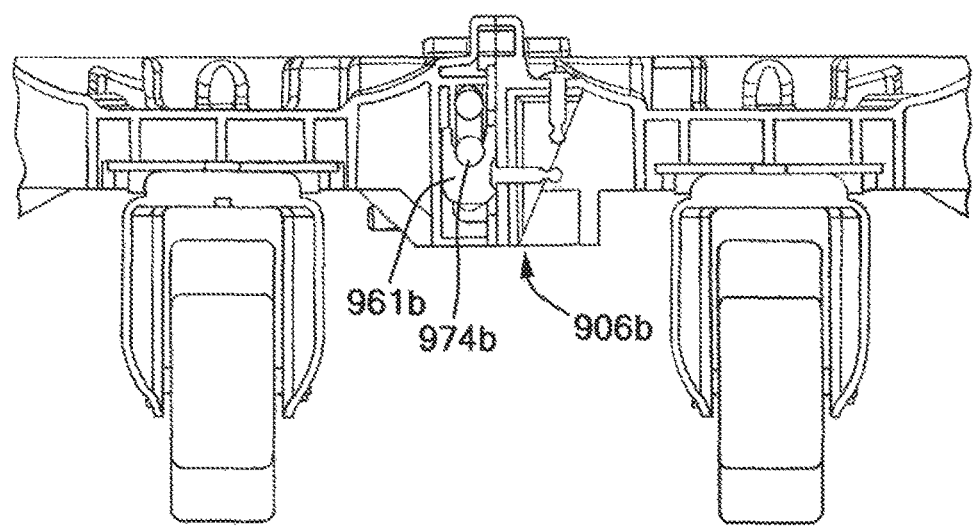
FIG. 68 is an enlarged view of an opposite edge of the double dolly of FIG. 67.

FIG. 63 shows the second lateral edge 908' has three centrally disposed and horizontally spaced cylindrical channels 976 to receive the three cylindrical posts 948. Latches 961 flank the cylindrical channels 976 are generally U-shaped with the U-shaped latch facing downwardly in 961a and upwardly in 961b. FIGS. 67 and 68 show the two dollies connected together with the bail arm engaged and disengaged with the latches. FIG. 67 shows end 906a having the bail arm 974a engaged and disengaged with the downwardly facing U-shaped latch 961a and FIG. 68 shows end 906b with the bail arm end 974b engaged and disengaged with the upwardly facing U-shaped latch 974b. The bail arm is within the U-shaped latch when in the engaged position. The U-shaped latches extend through the windows 949.

Figure 71:
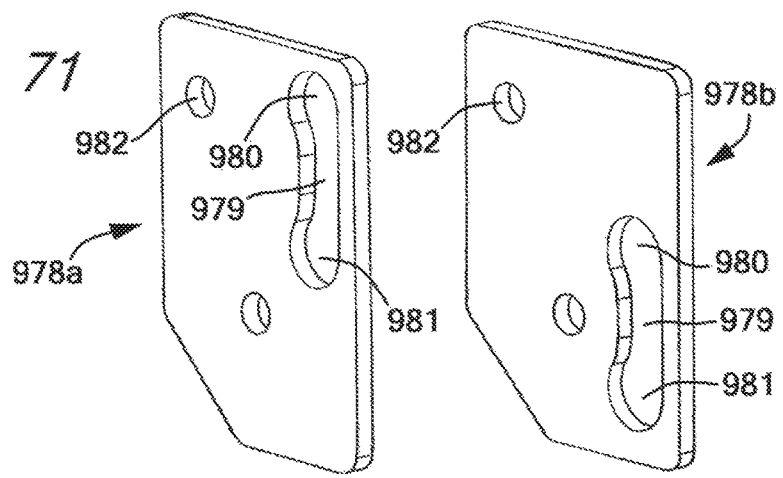
FIG. 71 is a perspective view of two bail arm end plates one of each mounted on opposite edges of the double dolly.
Figure 72:
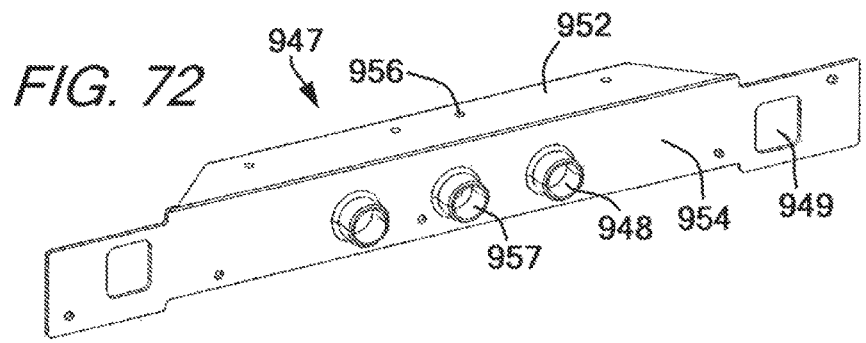
FIG. 72 is a perspective view of a bail arm center retainer plate.
Figure 73:
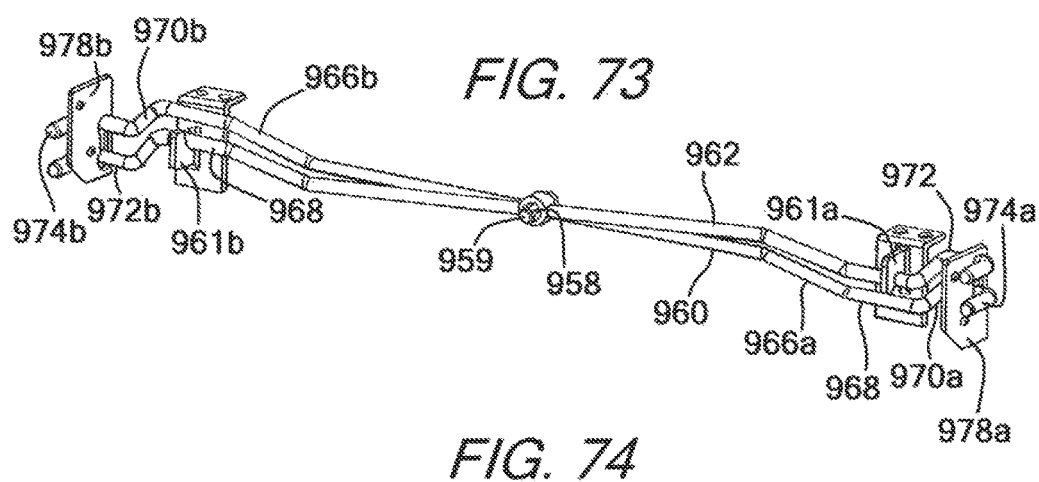
FIG. 73 is a perspective view of a subassembly of a bail arm in both latching and unlatching positions.
Figure 74:
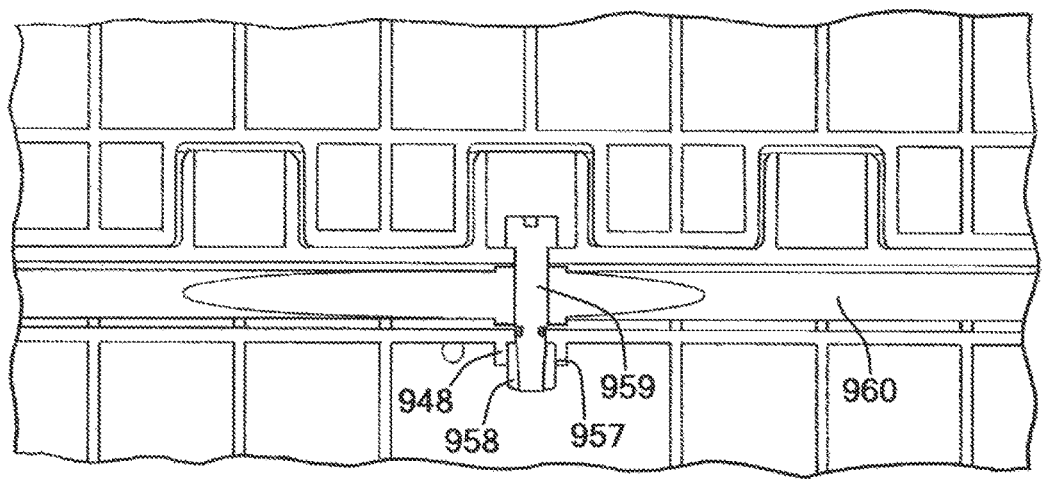
FIG. 74 is a bottom plan view of the bail arm in a locked position.
Figure 75:
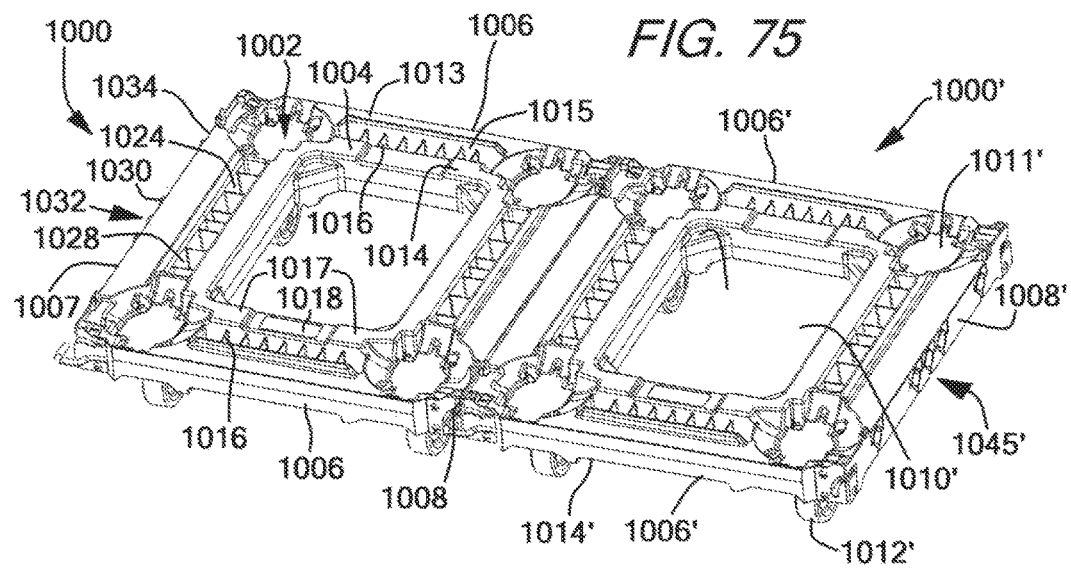
FIG. 75 is a perspective view of a double dolly connected.

FIG. 71 shows end plates 971a and 971b. The end plates have a vertically extending slot 979 for accommodating the bail arm and having an upper 980 stop and a lower stop 981 and two through holes 982 for attaching the end plates to the dolly.

To operate the dolly 900, a first dolly 900 and a second dolly 900' are pushed together to place the first lateral edge of dolly 900 into contact with the second lateral edge of the second dolly 900'. The cylindrical posts 949 are aligned with the cylindrical channels 976 and the U-shaped latches 961 are aligned with the windows 949. The dollies are pushed together and bail arm 974a is pushed upwardly (FIG. 69) to lock the dollies together. To release the dollies, the bail arm 974a is pushed downwardly and the two dollies can then be separated.

FIGS. 75-87 show yet another embodiment of a connectable dolly 1000 and double dolly 1000, 1000' having a platform 1002, an upper surface 1004, two opposed end edges 1006, a first lateral edge 1007, a second lateral edge 1008 and a centrally disposed aperture 1010 with triangular shaped flanges 1019 in each corner. Four wells 1011 are positioned at corners of the platform and a plurality of caster wheels 1012 extend from a bottom surface 1014 of the platform. The wells 1011 are dimensioned to receive the caster wheels 1012 of a similarly configured dolly when in a stacked configuration shown in FIG. 24. An outer and inner retaining wall 1013,1014 extend along each of the opposed end edges 1006 between a pair of adjacent wells 1011 and on opposed edges of a channel 1015. A plurality of horizontally spaced ribs 1016 extend across the channel in a direction generally perpendicular to the end edge 906. The inner retaining wall 1014 is castellated having two flanking segments 1017 of the same height and a central segment 1018 of a lower height. A pair of horizontally spaced protuberances 1020 extends downwardly from a bottom edge of the end wall. The protuberances 1020 provide a surface for tines of a fork lift to engage and to protect the casters from contact with the fork lift tines.

Figure 76:
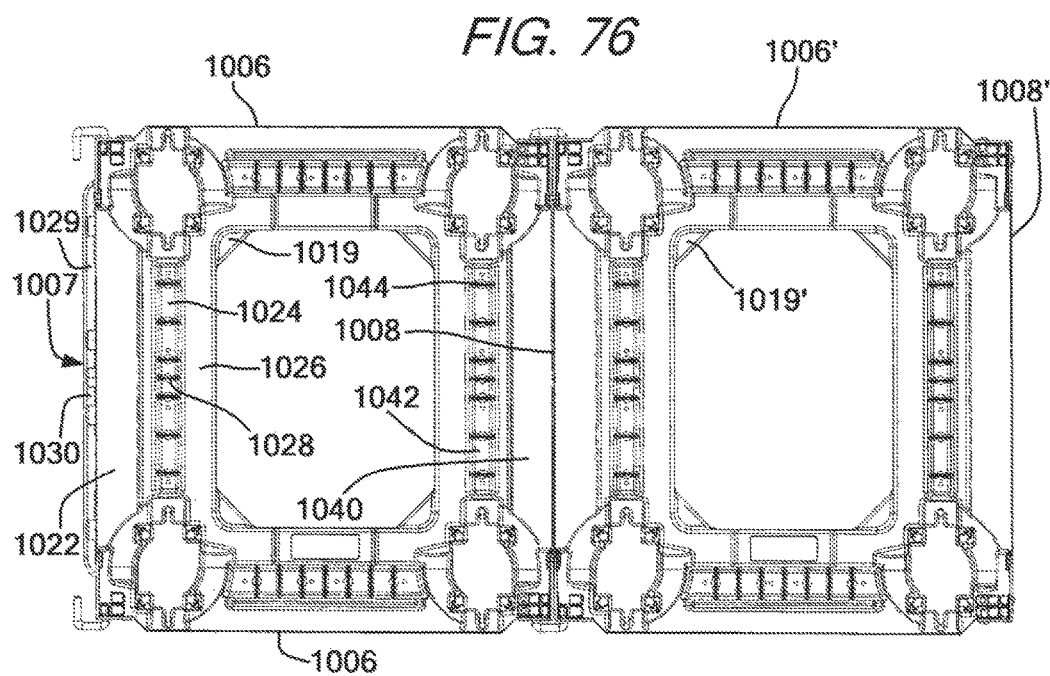
FIG. 76 is a top plan view of the double dolly of FIG. 75.
Figure 77:
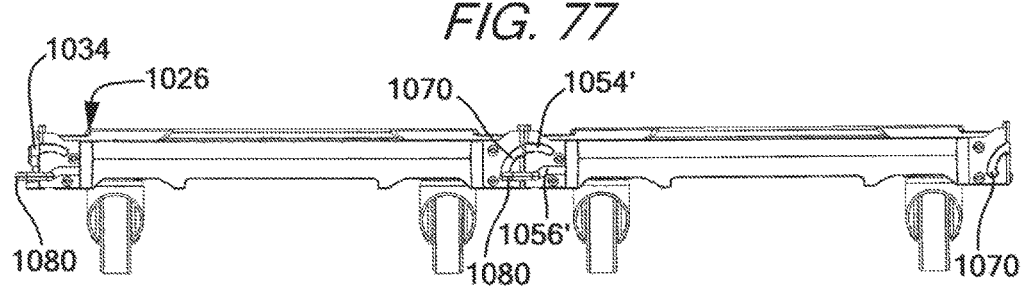
FIG. 77 is a side elevation view of the double dolly of FIG. 75.
Figure 78:
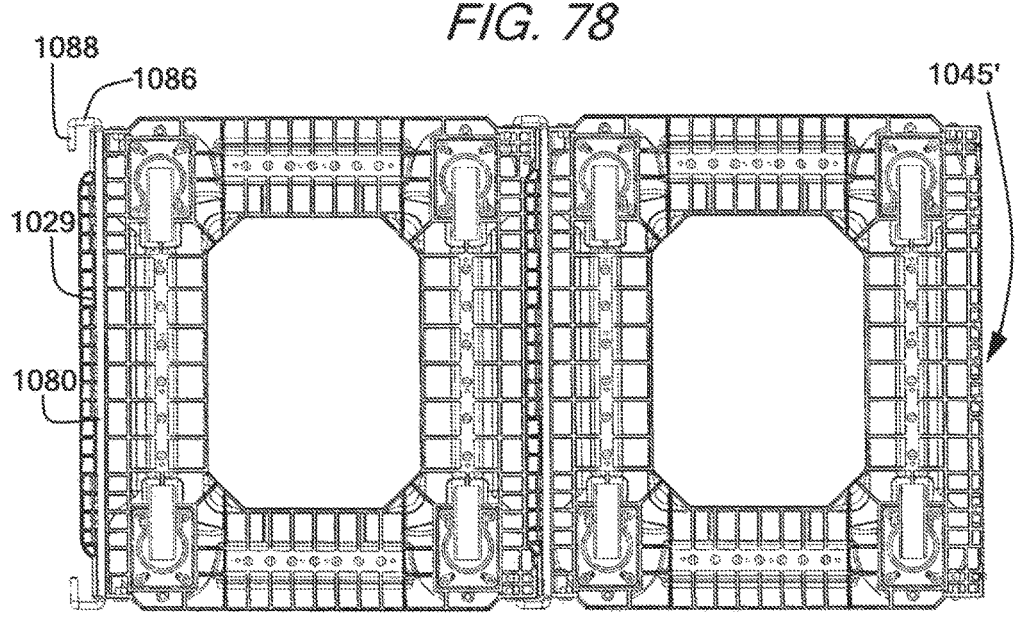
FIG. 78 is a bottom plan view of the double dolly of FIG. 75.

As best seen in FIG. 76 the first lateral edge 1007 has a centrally disposed, generally rectangular strip 1022, and a retaining wall 1026 extending to a height above the strip 1022. The retaining wall 1026 is separated from the strip 1022 by a channel 1024 having a plurality of horizontally spaced ribs 1028 spanning the channel. A bail arm retaining flange 1029 (see also FIG. 78) extends perpendicularly from a vertical surface of the first lateral edge 1007 and along generally the entire length of the first lateral edge 1007. Also extending from the vertical surface of the first lateral edge 1007 are five horizontally spaced guide posts 1030 having three closely spaced central guide posts 1032 flanked on opposite ends by two flanking guide posts 1034. The guide posts 1030 are positioned above the bail arm retaining flange 1029.

The second lateral edge 1008 has a retaining wall 1040 divided into segments by a channel 1042. The channel 1042 contains a plurality of horizontally spaced ribs 1044 spanning the channel. Five guide channels 1045 are horizontally spaced and are dimensioned to receive the five guide posts 1030 projecting from the first end 1007.

Figure 79:
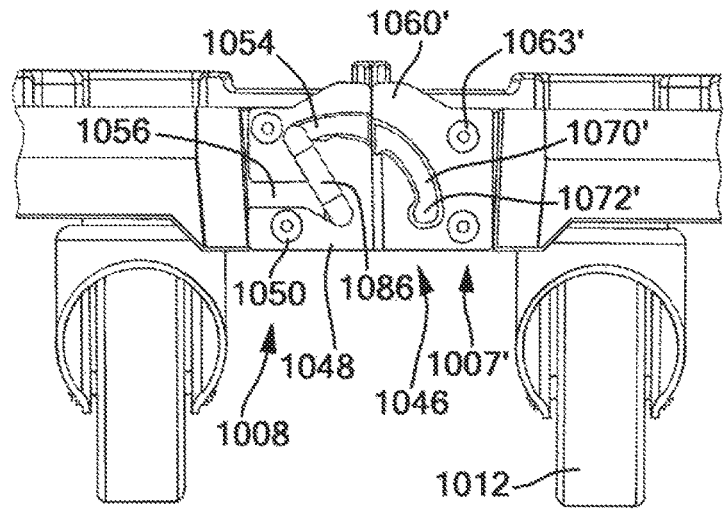
FIG. 79 is an enlarged view of an end of two dollies in a disengaged position.
Figure 80:
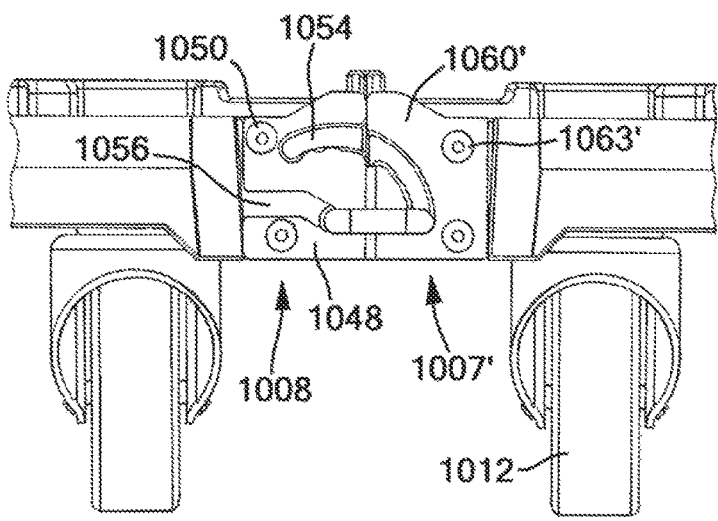
FIG. 80 is an enlarged view of an end of the two dollies in an engaged position.

FIGS. 79 and 80 show a bail arm latching mechanism 1046 for connecting the dollies together. The end wall 1006 has a portion 1031 that tapers inwardly of the dolly to form a pocket 1033 that protects the bail arm latching mechanism from physical impacts. FIGS. 79 and 80 show two dollies abutting one another along the second lateral edge 1008 of one dolly with a first lateral edge 1007' of a second dolly and in a disengaged position in FIG. 79 and an engaged position FIG. 80. A bail arm end plate 1048 is attached to end 1006 with two threaded fasteners 1050 that extend through through holes 1052 in the plate 1048 (FIG. 83) and then into threaded holes provided on the dolly. The plate 1048 also has two arcuate slots 1054 and 1056. A bail arm corner lock plate 1060' (see also FIGS. 84 and 85) is generally L-shaped having a first plate 1061 and a second plate 1062 disposed perpendicular to the first plate. The first plate has two through holes 1063 and the second plate has a through hole 1064 that receive threaded fasteners 1065 to attach the corner lock plate 1060 to the dolly. The first plate 1061 also has an arcuate slot 1070. The arcuate slots are dimensioned to accommodate a bail arm 1080 (FIG. 82).

FIG. 82 shows the bail arm 1080 having an elongate central section 1082 and opposed U-shaped terminal ends 1084. The U-shaped terminal ends have a first segment 1086 extending perpendicular from the central section and a return segment 1088 extending perpendicular to the first segment 1086 and parallel to the first segment and in an inward direction toward a center point of the central section. The bail arm is rotatably attached to the dolly with the central section 1082 having opposed ends with each end being received in a pocket 1090 of the bail arm end plate 1048 and the U-shaped ends extending outward beyond the plate, first segment 1086 spans a gap between slots 1054, 1056 and a distal end of the return segment 1088 rides in slot 1054. Upon rotation of the bail arm 1080 about an axis through the central section, the U-shaped ends move from a disengaged position shown in FIG. 79 to an engaged position shown in FIG. 80. Slot 1054 is in alignment with slot 1070' and when the U-shaped ends are fully rotated to the engaged position, the return segment is received in a pocket 1072'.

Figure 81:
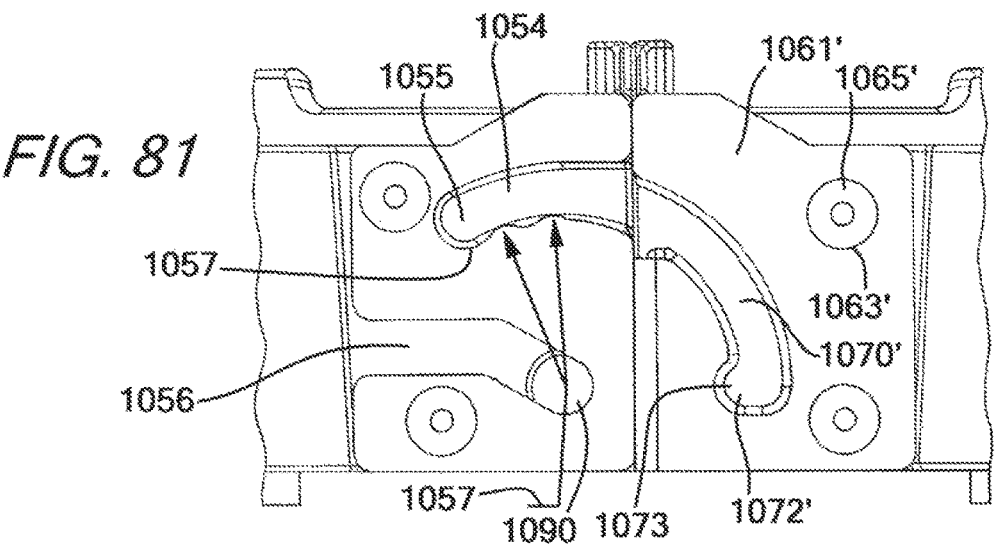
FIG. 81 is an enlarged view of an end of the two dollies showing a locking feature.

FIG. 81 provides further details of the arcuate slots 1054, 1056 and 1070'. Arcuate slot 1054 has an enlarged proximal end with an undercut 1057 to form a pocket 1055, two restriction bumps 1057 to hold the bail arm in the pocket 1055 and to prevent the bail arm from vibrating out of a stored position (FIG. 79). The pocket 1072' also has an undercut 1073 at a distal end of the slot 1070'.

To operate the connectable dolly of FIGS. 75-85, two of the same dollies are positioned into engagement along lateral edge 1008 of the first dolly with the lateral edge 1007' of the second dolly. The guide posts 1030 are inserted into the guide channels 1045 (FIG. 87), then bail arm is rotated clockwise from the disengaged position (FIG. 79) to the engaged position (FIG. 80) to lock the two dollies together.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. A connectable dolly comprising:
   a platform having an upper surface, a peripheral edge and a bottom surface, a portion of the peripheral edge has a vertical surface;
   a plurality of caster wheels extending from the bottom surface and attached thereto; and
   an elongate bail arm having a first end and a second end opposed to the first end and mounted along a portion of the peripheral edge for rotational motion about an axis between a stored position and a deployed position, the axis being transverse to the vertical surface, the second end having an engaging member dimensioned for removably connecting the connectable dolly to a second dolly.

2. The dolly of claim 1 wherein a portion of the bail arm is disposed in a pocket in the peripheral edge.

3. The dolly of claim 1 wherein the connector element is spring loaded.

4. The dolly of claim 1 further comprising a receiving member on a second dolly for engaging the second end of the bail arm.

5. The dolly of claim 4 wherein the receiving member is a slot.

6. The dolly of claim 5 wherein the slot is arcuate.

7. The dolly of claim 6 wherein the arcuate slot has a protuberance extending into the slot to form a pocket for retaining the first end from inadvertent disengagement.

8. The dolly of claim 4 wherein the receiving member is a through hole.

9. The dolly of claim 4 wherein the receiving member is a channel formed in the second dolly.

10. The dolly of claim 9 wherein the channel is upwardly facing.

11. The dolly of claim 9 wherein the channel is downwardly facing.

12. The dolly of claim 1 wherein the axis is generally perpendicular to the vertical surface and extends through an intermediate portion of the bail arm between the first end and the second end.

13. The dolly of claim 12 wherein the axis is centrally disposed between the first end and the second end.

14. The dolly of claim 13 wherein the first end of the bail arm is mounted for movement between two vertically spaced positions, one of each corresponding to the stored position and the deployed position.

15. A connectable dolly comprising:
    a platform having an upper surface, and a peripheral edge, the peripheral edge including a first lateral edge and a second lateral edge opposed to the first lateral edge, and a first end edge and a second end edge opposed to the first end edge;
    a connector element mounted to the platform proximal the first lateral edge and moveable from a stored position to a deployed position, the connector element having a proximal end and a distal end, the distal end having an engaging member dimensioned for removably connecting the connectable dolly to a receiving member on a second dolly; and
    an interlock feature on the peripheral edge.

16. The dolly of claim 15 wherein the interlock feature comprises a protuberance extending from the peripheral edge for engaging a complementary-shaped member on the second dolly.

17. The dolly of claim 16 wherein the peripheral edge has a vertically extending surface and the protuberance extends from the vertically extending surface.

18. The dolly of claim 15 wherein the interlock feature is on the first lateral edge or the second lateral edge.

19. The dolly of claim 15 wherein the interlock feature is on the first lateral edge.

20. The dolly of claim 15 wherein the interlock feature is on the second lateral edge.

21. The dolly of claim 15 wherein the interlock features is at least one wall extending away from a vertical surface of the peripheral edge.

22. The dolly of claim 21 wherein the wall is generally cylindrical.

23. The dolly of claim 21 wherein the interlock feature comprises a plurality of cylindrical walls extending away from the vertical surface of the peripheral edge.

24. The dolly of claim 23 wherein the plurality of cylindrical walls are horizontally spaced from one another.

25. The dolly of claim 23 wherein the interlock feature comprises a plurality of horizontally spaced cylindrical walls centrally disposed on a portion of the peripheral edge and two flanking cylindrical walls, one of each of the two flanking walls disposed on opposite sides of the centrally disposed cylindrical walls and horizontally spaced therefrom.

26. A connectable dolly comprising:
    a platform having an upper surface, a peripheral edge and a bottom surface, the peripheral edge having a vertically extending surface;
    a ground engaging structure extending from the dolly; and
    a first bail arm mounted to a portion of the peripheral edge for rotation about an axis extending generally parallel to a portion of the peripheral edge from a stored position to a deployed position, the first bail arm having a generally elongate central portion and connecting members at opposed ends of the central portion, the elongate central portion having an engaging portion to cause the first bail arm to rotate when contacted by a member extending from a second dolly, when in the deployed position, a portion of the connecting members engage a corresponding receiving member on a second dolly.

27. The dolly of claim 26 wherein a portion of the generally elongate central portion engages a corresponding structure on the second dolly when the first bail arm is in the deployed position.

28. The dolly of claim 26 further comprising a second bail arm on the second dolly for engaging the first bail arm when the first bail arm is in the deployed position.

29. The dolly of claim 26 further comprising an interlock feature on the peripheral edge of the dolly.

* * * * *